United States Patent
Wolfson et al.

(10) Patent No.: US 7,849,139 B2
(45) Date of Patent: Dec. 7, 2010

(54) ADAPTIVE SEARCH IN MOBILE PEER-TO-PEER DATABASES

(76) Inventors: Ouri Wolfson, 1030 N. State St., Suite 40C, Chicago, IL (US) 60610; Bo Xu, 3033 Burlington Ave., Lisle, IL (US) 60532

( * ) Notice: Subject to any disclaimer, the term of this patent is extended or adjusted under 35 U.S.C. 154(b) by 319 days.

(21) Appl. No.: 12/114,150

(22) Filed: May 2, 2008

(65) Prior Publication Data

US 2009/0210495 A1 Aug. 20, 2009

Related U.S. Application Data

(60) Provisional application No. 60/915,574, filed on May 2, 2007.

(51) Int. Cl.
G06F 15/16 (2006.01)
G06F 15/173 (2006.01)
G06F 15/177 (2006.01)

(52) U.S. Cl. .................. 709/205; 709/219; 370/252; 370/310

(58) Field of Classification Search ............ 709/205, 709/217–224; 370/252, 310
See application file for complete search history.

(56) References Cited

U.S. PATENT DOCUMENTS

| | | | |
|---|---|---|---|
| 5,915,207 A | 6/1999 | Dao | |
| 6,112,206 A | 8/2000 | Morris | |
| 6,292,657 B1 | 9/2001 | Laursen | |
| 6,604,140 B1 | 8/2003 | Beck | |
| 6,708,107 B2 | 3/2004 | Impson | |
| 6,718,394 B2 | 4/2004 | Cain | |
| 6,735,448 B1 | 5/2004 | Krishnamurthy | |
| 6,785,542 B1 | 8/2004 | Blight | |
| 6,807,165 B2* | 10/2004 | Belcea | 370/347 |
| 6,810,323 B1 | 10/2004 | Bullock | |
| 6,816,460 B1 | 11/2004 | Ahmed | |
| 6,845,091 B2 | 1/2005 | Ogier | |
| 6,870,846 B2 | 3/2005 | Cain | |
| 6,873,839 B2 | 3/2005 | Stanforth | |
| 6,879,574 B2 | 4/2005 | Naghian | |
| 6,909,721 B2 | 6/2005 | Ekberg | |
| 6,940,832 B2 | 9/2005 | Saadawi | |
| 6,954,435 B2 | 10/2005 | Billhartz | |
| 6,957,069 B2 | 10/2005 | Shah | |
| 6,961,575 B2 | 11/2005 | Stanforth | |
| 6,970,714 B2 | 11/2005 | D'Souza | |
| 7,027,772 B2 | 4/2006 | Chen | |
| 7,043,252 B2 | 5/2006 | Khitrik | |
| 7,072,650 B2 | 7/2006 | Stanforth | |
| 7,110,372 B2 | 9/2006 | Kovacs | |
| 7,113,796 B2 | 9/2006 | Zhang | |

(Continued)

OTHER PUBLICATIONS

G. Cao, L. Yin, C. Das. Cooperative Cache-Based Data Access in Ad Hoc Networks. Computer, vol. 37, No. 2, pp. 32-39, Feb. 2004.

*Primary Examiner*—Haresh N Patel
(74) *Attorney, Agent, or Firm*—Justin Lampel

(57) ABSTRACT

Information is stored in a plurality of mobile peers. The peers communicate in a peer to peer fashion, using a short-range wireless network. Occasionally, a peer initiates a search for information in the peer to peer network by issuing a query. Queries and pieces of information, called reports, are transmitted among peers that are within a transmission range. For each search additional peers are utilized, wherein these additional peers search and relay information on behalf of the originator of the search.

17 Claims, 12 Drawing Sheets

U.S. PATENT DOCUMENTS

| | | |
|---|---|---|
| 7,149,534 B2 | 12/2006 | Bloebaum |
| 7,151,757 B2 * | 12/2006 | Beasley et al. .............. 370/331 |
| 7,151,769 B2 | 12/2006 | Stanforth |
| 7,177,295 B1 * | 2/2007 | Sholander et al. ........... 370/338 |
| 7,181,230 B2 | 2/2007 | Nonoyama |
| 7,184,421 B1 | 2/2007 | Liu |
| 7,609,644 B2 * | 10/2009 | Tateson ..................... 370/252 |
| 2004/0218548 A1 * | 11/2004 | Kennedy et al. ............ 370/254 |
| 2007/0038743 A1 * | 2/2007 | Hellhake et al. ............ 709/224 |
| 2007/0087756 A1 * | 4/2007 | Hoffberg .................... 455/450 |
| 2007/0213046 A1 * | 9/2007 | Li et al. ...................... 455/425 |
| 2008/0025270 A1 * | 1/2008 | Moon ........................ 370/338 |
| 2008/0114750 A1 * | 5/2008 | Saxena et al. .................. 707/5 |
| 2010/0058442 A1 * | 3/2010 | Costa et al. .................... 726/3 |

* cited by examiner

701↓

$$E(Th) = 2 \cdot \pi \cdot \lambda \cdot k \cdot \int_0^r \delta \cdot (1-p')^{\lambda \cdot r^2 \cdot (2 \cdot q(\frac{\delta}{2 \cdot r}) + (\pi - 2 \cdot q(\frac{\delta}{2 \cdot r})) \cdot (2T+1)) - 1} d\delta$$

where $T = \dfrac{(M+h) \cdot 8}{b \cdot \tau}$, and for a fraction $a$, $q(a) = \arccos(a) - a\sqrt{1-a^2}$

702↓

$$ThR \approx 2 \cdot \pi \cdot \lambda \cdot k \cdot \frac{1}{c} \cdot \int_0^r \delta \cdot (1-p')^{\lambda \cdot r \cdot (2 \cdot q(\frac{\delta}{2 \cdot r}) + (\pi - 2 \cdot q(\frac{\delta}{2 \cdot r})) \cdot (2T+1)) - 1} d\delta$$

Figure 7

ADAPTIVE SEARCH IN MOBILE PEER-TO-PEER DATABASES

CROSS-REFERENCE TO RELATED APPLICATIONS

This application claims priority from U.S. Provisional Patent Application No. 60/915,574 filed May 2, 2007. The provisional patent is incorporated herein by reference in its entirety.

FEDERALLY SPONSORED RESEARCH

This invention was made with government support under grant numbers NASA NNA06AA25C and National Science Foundation OII-0611017.

BACKGROUND OF THE INVENTION

1. Field of Invention

This invention pertains to mobile computers. It enables a group of such computers to share information and query information stored in the group (the global database).

2. Prior Art

A Mobile Ad-hoc NETwork (MANET) is a set of mobile peers (sensors, PDA'S, Blackberry's, vehicles, etc.) that communicate with each other via short range wireless protocols, such as IEEE 802.11, Bluetooth, Zigbee, or Ultra Wide Band (UWB) (see FIG. 1). Consider a database that is distributed among the peers of the MANET. On each mobile peer there is a local database that stores and manages a collection of reports. A report is a set of values sensed by the peer, entered by the user, or otherwise obtained by a mobile peer. Often a report describes a physical resource such as an available parking slot.

All the local databases maintained by the mobile peers form the MANET database. The peers communicate reports and queries to neighbors directly, and the reports propagate by transitive multi-hop transmissions. FIG. 2 illustrates a MANET database.

Generally, there are two paradigms to conduct MANET data dissemination, namely state-full and stateless. In state-full dissemination, a routing structure is imposed and maintained among the mobile peers (e.g., [1]). State-full dissemination may be ineffective in a large and highly mobile MANET, since the routing structure quickly becomes obsolete. It is also ineffective in sparse and loosely connected networks in which a routing structure cannot cover the whole network. In stateless dissemination, the intermediate peers save reports and later (as new neighbors are discovered) transfer these reports. In the literature this paradigm is also called stateless gossiping, epidemic, or store-and-forward dissemination. This invention addresses the stateless paradigm for reports dissemination. Our invention does not rely on any infrastructure, central server, or routing data structures. Any subset of peers will be able to separate from the network and share information by stateless dissemination.

The problem with the store-and-forward dissemination is that the reports that need to be stored and forwarded by a node may exceed its storage, bandwidth, and energy capacities. Here is where two innovative aspects of the present patent come into play.

1. Adaptive control of transmission size or inter-transmission period. This invention includes a strategy by which a mobile node dynamically adjusts the number of reports included in a transmission or the period of time between two consecutive transmissions to other mobile peers. The number depends on the period of time between two consecutive transmissions (the longer the period, the larger the number of reports that the peer is allowed to communicate), the available energy, the bandwidth, and the contact time between encountering neighbors. The inter-transmission period depends on the number of reports included in a transmission, the available energy, the bandwidth, and the contact time between encountering neighbors. With such adaptive control of transmission size, the number of collisions is minimized and the available bandwidth is optimally utilized.

2. Reports prioritization. Given the bandwidth, energy, and memory constraints for the mobile peers, we believe that ranking of alerts is important in MANET databases, so that the most important reports are transmitted and saved. Therefore this invention includes a ranked store-and-forward method (called MARKET) for reports dissemination. The rank of a report may depend on factors such as its demand (how important it is to the mobile nodes), its supply (how many mobile nodes have already received it), and its size.

2.1 Patents

Data/Information Dissemination in Mobile Wireless Environments

Patents [16-21] require dedicated apparatuses such as data servers or base stations to collect and disseminate data. Our system does not require any such apparatuses. In patents [26, 27], data is disseminated among vehicles in a peer-to-peer fashion without relying on any dedicated infrastructure. However, these patents do not address bandwidth/power management (how much to transmit, what to transmit) and memory management (what to save), whereas we do. These issues are important because in many mobile P2P environments at least one limitation (bandwidth, power, or memory) is a concern.

Resource/Service Discovery in Mobile Wireless Environments

Patents [22, 24] require directory agents be selected from the mobile peers. The directory agents collect resource information and deliver it to other mobile peers upon requests. This paradigm is not suitable for a high mobility environment as it is difficult to conduct a selection of directory agents in such an environment. In addition, there may not be a path from a mobile peer to any directory agent. Patent [23] addresses the issue of choosing from multiple network interfaces a right one to deliver a resource request. In [25], each mobile peer periodically transmits a set of resources by multicasting. The advertised resources may be produced by the peer itself or by other peers, i.e., there is brokering. However, [25] does not provide solutions to questions such as how many resources are included in each transmission, how to select the resources to transmit, and so on, whereas our system addresses these issues.

Mobile Ad-hoc Networks

Many patents (see [34-44]) concern routing a message to a specific destination given by the network address or the location. In our case the network addresses or the locations of the destinations (i.e. consumers) are not known a priori. Other patents ([28-33]) disclose systems and methods for seamless and cost efficient access to the infrastructure network. For example, in [30, 31], mobile ad hoc networks are used as a bridge to the cellular network. For another example, [32] discloses a method in which a mobile device that is accessing the internet via a cellular infrastructure automatically switches to the home wireless network when getting home. Our system concentrates on data management within the mobile ad hoc network rather than establishing a communication path from a mobile device to the infrastructure network. Patents [45, 46] deal with power management in ad hoc networks. They do so by adjusting the transmission power such that the source-to-destination throughput is optimized or a certain connectivity constraint is satisfied. We deal with power efficiency by brokering the reports that are mostly likely to be useful to other peers.

2.2 Scientific Papers

Prioritization in mobile peer-to-peer data dissemination. Ranking reports for memory (cache) management and bandwidth management in mobile peer-to-peer networks has been studied in a number of works. In [3] reports are ranked randomly. In [9] the rank of a report for storage only is jointly determined by its demand, reliability, and size, but not on supply. Our comparison with RANDI demonstrates the importance of supply. In [11] reports are ranked based on their spatio-temporal relevance. The relevance indicates, for example, the probability that a parking slot reported by the report will be still available when the user reaches it. This relevance can be incorporated into MARKET by having the rank of a report weighted by its relevance (see footnote 4). In [13][6] reports are ranked based on an abstract utility function which is to be defined by specific applications. Our ranking method can be viewed as an instantiation of the utility function.

Delay/Fault-Tolerant Mobile Sensor Networks [14]. This work studies how to efficiently deliver reports from sensors to sinks in disconnected mobile sensor networks. It is assumed that every sink is interested in receiving every sensor-produced report. In our context, there are queries and they may be different for different sinks, and these have significant implications in the P2P interaction mode and reports ranking.

Resource discovery (e.g. [12]) and Publish/subscribe (e.g. [1]) in MANET's. These papers often build a routing structure for resource information dissemination. Consequently they can be inefficient, particularly in networks that are prone to frequent topology changes and disconnections due to mobility and turn-over. In such an environment, either a lot of communication has to be expended to keep the routing structure up to date, or the routing structure rapidly becomes obsolete and misses many matches. Furthermore, these methods depend on network connectivity, and do not work in sparse networks.

Cooperative caching in mobile environments. The MARKET algorithm performs a form of cooperative caching; the local database of each mobile peer is a cache that services a query originator in the QR operation. However, in most of the existing work on cooperative caching (see e.g., [2][8]), a report is cached at a mobile peer when it is queried by the mobile peer itself or by some other peer. In other words, the caching is reactive. This does not provide good data access in a sparse environment, because the query does not propagate out, and thus there is no cache. The MARKET algorithm, on the other hand, proactively transmits reports during an encounter, so as to enhance the receiver's capability as a broker. This enables data access in a sparse environment.

Energy-efficient broadcasting in MANET's. The work in this area (see [10] for a survey) studies how to flood a single message to all the nodes in a connected MANET with minimum energy consumption. MARKET differs from MANET broadcasting in several aspects. First, the objective of MARKET is to deliver each report to as many mobile peers that are interested in them as possible, rather than delivering the report to all the mobile peers. Second, MARKET does not require a contemporaneous path between the report producer and a report consumer, whereas MANET broadcasting does. Finally, MARKET deals with a continuous process of data dissemination rather than the flooding of a single message.

3. Objects and Advantages

This invention develops a MANET database without a central point of failure or reliance on servers. The database will be used to disseminate reports throughout the MANET. The heart of our invention is a distributed method that disseminates reports intelligently in an adaptive manner. Using this method, each mobile peer makes local decisions on when to disseminate reports, how many to disseminate, and which reports to disseminate. With the local decisions made by each individual peer, the whole MANET database maximizes the number and timeliness of reports disseminated to the mobile nodes, under the bandwidth, energy, and memory constraints.

The invention, called MOBIDIK (MOBIle DIscovery of local Knowledge), is a software technology embedded in mobile devices such as cell phones, PDA'S, laptops, etc. It will provide a user the ability to search for local resources such as a person of interest, a restaurant, or a parking slot. The search is conducted in a peer-to-peer rather than client/server (a la Google) mode.

When there is a community of mobile devices near each other and they communicate with each other, they form a network called a Mobile Peer-to-peer (MP2P) network. MOBI-DIK provides advanced communication control, information dissemination, power management, resource discovery, and filtering algorithms to greatly enhance the capabilities of MP2P networks, facilitating more robust applications and extending the range of communication.

MOBI-DIK allows a mobile device to satisfy a local search by communicating with encountered devices in a multi-hop, self-forming network, to propagate information, and to obtain new information in exchange. It is particularly useful for searching highly-relevant (in time, space, and interest) resources in a local environment, such as a person with certain qualifications at a convention, an available parking slot, a nearby taxicab or restaurant, or the rapid dissemination of an image of a person of interest to first responders.

3.1. Commercial Applications and their Rationale

MOBI-DIK can be used to enable mobile local search. Mobile local search is a procedure in which a mobile user searches for local resources, i.e. resources that are in geographic proximity to the mobile user (e.g., enemy engagements or other incidents in a convoy, a person with certain expertise in a convention hall, a ride-share opportunity, a taxi-cab, a parking slot, etc). In mobile local search applications the local resources that are of interest to mobile users are often only available during a limited period of time and these resources themselves may be mobile. For example, a cab driver wants to find a customer nearby. The customer may be moving and she is available only until she hires a cab. Similarly, the current traffic speed on a road segment, the available parking slots around a driver, the available workstations in a large convention hall, are temporarily valid or available resources. We call these spatio-temporal resources, in the sense that the resources or events are relevant in a limited geographic area, and for a limited time duration. Mobile local search for spatio-temporal resource is a special case of resource discovery and publish/subscribe applications.

Google or local.com currently provide static local information, but not dynamic of the type described above. A local server may not exist due to lack of a profitable business model, and if it exists it may be unavailable (such servers are unlikely to have the reliability of global sites such as Google), or the data may not be available for several reasons such as propagation delays (think of sudden-brake information that needs to be propagated to a server and from there to the trailing vehicles), or due to device limitations (e.g. a smart cell-phone may have Bluetooth but not internet access), etc. Furthermore, even if the infrastructure and a server are both available, a user may not be willing to pay the dollar-cost that is usually involved in accessing the server through the licensed spectrum, or, the server may accept only data from certain users, or only data related to certain applications but not others. An infrastructure may also not be available in military/combat situations, disaster recovery, in a commercial flight, etc. Thus, MOBI-DIK substitutes or augments the client-(local)-server approach by a MANET approach in which devices communicate with each other via short range wireless communication. MOBI-DIK has many potential commercial applications, including:

Social Networks. In a large professional, political, or social gathering, MOBI-DIK is useful to automatically facilitate a face-to-face meeting based on matching profiles. For example, in a professional gathering, MOBI-DIK enables attendees to specify queries (interest profiles) and resource descriptions (expertise) to facilitate conversations, when mutual interest is detected. This opportunistic matchmaking can greatly enhance the value of networking events allowing users to connect with targeted, interested parties without a priori knowledge of their name, title, phone number, or other personal information. A face-to-face meeting can be setup by including in the resource description the identification information of the resource (person), such as cell-phone number, email address, picture, physical description, etc. This information may be used together with the (possibly imprecise) location to help set up the face-to-face meeting. Thus, the individual's profile that is stored in MOBI-DIK will serve as a "wearable web-site". Similarly, MOBI-DIK can facilitate face-to-face meetings in singles matchmaking.

Emergency Response, Homeland Security. MOBI-DIK offers the capability to extend decision-making and coordination capability. This finds applications in emergency environments, an area of particular concern to the government trying to find technologies that can be exploited to support the more than eight million first responders[1] in U.S. homeland security. Consider workers in disaster areas, soldiers and military personnel operating in environments where the wireless fixed infrastructure is significantly degraded or non-existent. They would welcome a capability that lets them automatically propagate messages, pictures, or resource information to other workers, based on matching profiles, security, and attribute values rather than node-id. As mobile users involved in an emergency response naturally cluster around the location of interest, a self-forming, high-bandwidth network that allows secure point-to-point or point-to-multipoint communication without the need of potentially compromised infrastructure could be of great benefit. For instance, a picture of a wanted person could be propagated to all those involved in a targeted search at the scene.

[1] First responders are the personnel of organizations and agencies such as emergency medical services; fire, rescue, and hazardous material response teams; security and law enforcement agencies; relief organizations.

Consider a related emergency response application. Scientists are developing cockroach-sized robots or sensors that are carried by real cockroaches, which are able to search victims in exploded or earthquake-damaged buildings. These robots or sensors are equipped with radio transmitters. When a robot discovers a victim by sensing carbon dioxide, it may not have the transmission power to reach the outside rescuers; it can use local data dissemination to propagate the information to human rescuers outside the rubble. Sensors can also be installed on wild animals for endangered species assistance. A sensor monitors its carrier's health condition, and it disseminates an alert when an emergency symptom is detected.

Another potential application of MOBI-DIK is shipping container monitoring and inspection, in which sensors mounted on neighbouring containers can communicate and transitively relay alerts to remote checkpoints.

Mobile E-commerce. Consider short-range wireless broadcast and MANET dissemination of a merchant's sale and inventory information. It will enable a customer (whose cell phone is MOBI-DIK enabled) that enters a mall to locate a desired product at the best price. When a significant percentage of people have mobile devices that can query retail data, merchants will be motivated to provide inventory/sale/coupons information electronically to nearby potential customers. The information can be provided and disseminated (in, say, a mall or airport) by the MOBI-DIK software.

Airport Applications. Airports provide several different opportunities for the use of MOBI-DIK. From the point of view of commerce, airports have stores and kiosks where merchandise is sold similarly to a mall. Imagine arriving at a large airport and realizing you do not have the computer power cord you need for your presentation. MOBI-DIK will enable a user to search for the needed product—just like in a mall. Merchants can similarly provide their location information and offer promotional incentives to passengers.

MOBI-DIK can also be used by airport personnel to coordinate their activities. This is especially important when there is a communication failure due an emergency that degrades the infrastructure. Like the case of early responders, airport personnel can continue to coordinate their activities through the use of the MANET network that is available even though the infrastructure is not functioning. Another potential opportunity that will benefit both the travelers and the airport operations is the dissemination of real-time information regarding flight changes, delays, queue length, parking information, special security alerts and procedures, and baggage information. This can augment the audio announcements that often cannot be heard in restaurants, stores, or restrooms, and the limited number of displays.

Transportation Safety and Efficiency. MOBI-DIK software can improve safety and mobility by enabling travelers to cooperate intelligently and automatically. A vehicle will be able to automatically and transitively communicate to trailing vehicles its "slow speed" message when it encounters an accident, congestion, or dangerous road surface conditions. This will allow other drivers to make decisions such as finding alternative roads. Also, early warning messages may allow a following vehicle to anticipate sudden braking, or a malfunctioning brake light, and thus prevent pile-ups in some situations. Similarly, other resource information, such as ridesharing opportunities, transfer protection (transfer bus requested to wait for passengers), will be propagated transitively, improving efficiency of the transportation system.

Inefficiencies in the transportation system result in excessive environmental pollution, fuel consumption, risk to public safety, and congestion. Statistical data reveals that excess congestion cost the US economy over $69 billion in 2001 from fuel and wages alone. The amount of automobile travel has increased over the past two decades by 91%. The average annual delay due to traffic congestion has climbed over 300% in the past two decades, going from 7 hours spent stuck in traffic per person per year in 1982 to 26 hours in 2001.

Ridesharing (i.e., vehicles carrying more than one person, either publicly provided such as transit, a taxi, or a vanpool, or prearranged rides in a privately owned vehicle) and car sharing (i.e., a program that allows registered users to borrow a car on an hourly basis from fixed locations) have the potential to alleviate these problems. For example, the Illinois Dept. of Transportation is also sponsoring a ridesharing program in the AI lab at UIC.

Currently the matchmaking required in ridesharing is performed offline. However, the success of ridesharing will depend largely on the efficient identification and matching of riders/drivers to vehicles in real time in a local environment, which is where the benefit of our technology lies, providing information that is simultaneously relevant in time, location, and interest. MOBI-DIK incorporated in navigational devices and PDA's can be used to disseminate to other devices and PDA's information about relevant resources such as ridesharing partners, free parking slots, and available taxicabs or taxicab customers.

SUMMARY

The innovative aspects of the invention are:

1. Adaptive control of transmission size or inter-transmission period. This invention includes a strategy by which a mobile node dynamically adjusts the number of reports included in a transmission or the period of time between two consecutive transmissions to other mobile peers. The number depends on the period of time between two consecutive transmissions (the longer the period, the larger the number of reports that the peer is allowed to communicate), the available energy, the bandwidth, and the contact time between encountering neighbors. The inter-transmission period depends on the number of reports in a transmission, the available energy, the bandwidth, and the contact time between encountering neighbors. With such adaptive control of transmission size or inter-transmission period, the number of collisions is minimized and the available bandwidth is optimally utilized.

2. Reports prioritization. Given the bandwidth, energy, and memory constraints for the mobile peers, we believe that ranking of alerts is important in MANET databases, so that the most important reports are transmitted and saved. Therefore this invention includes a ranked store-and-forward method (called MARKET) for reports dissemination. The rank of a report may depend on factors such as its demand (how important it is to the mobile nodes), its supply (how many mobile nodes have already received it), and its size.

BRIEF DESCRIPTION OF THE DRAWINGS

An exemplary embodiment of the present invention is described herein with reference to the drawings, in which

FIG. 7 shows a formula for computing the throughput of a broadcast and a formula for computing the throughput rate of a broadcast.

DETAILED DESCRIPTION OF AN EXEMPLARY EMBODIMENT

Figure 1:
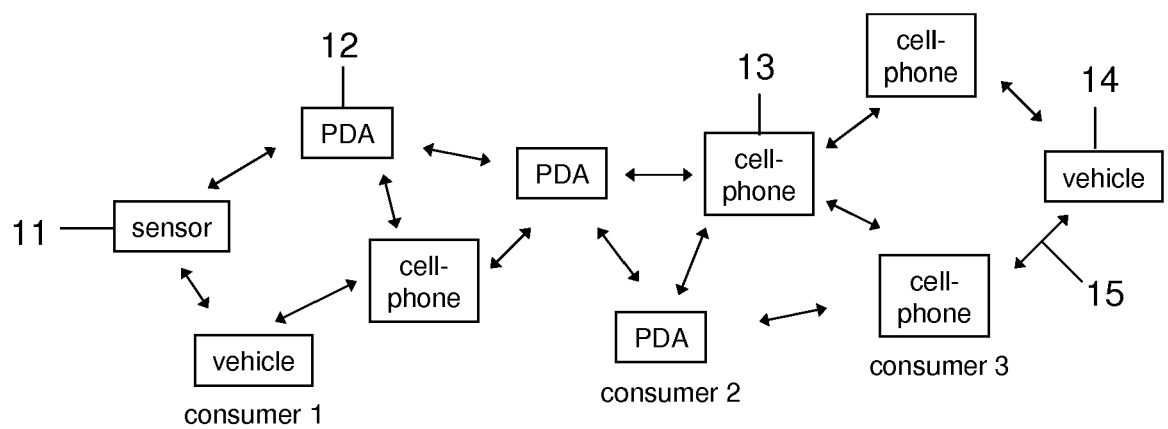
FIG. 1 shows a mobile ad hoc network of peers, where peers may be sensors, PDA'S, cell phones, vehicles.

FIG. 1 shows a mobile ad hoc network (MANET). The MANET is a set of mobile peers (sensors 11, PDA's 12, cell-phones 13, vehicles 14, etc.) that communicate with each other via short range wireless protocols 15, such as IEEE 802.11, Bluetooth, Zigbee, or Ultra Wide Band (UWB).

Figure 2:
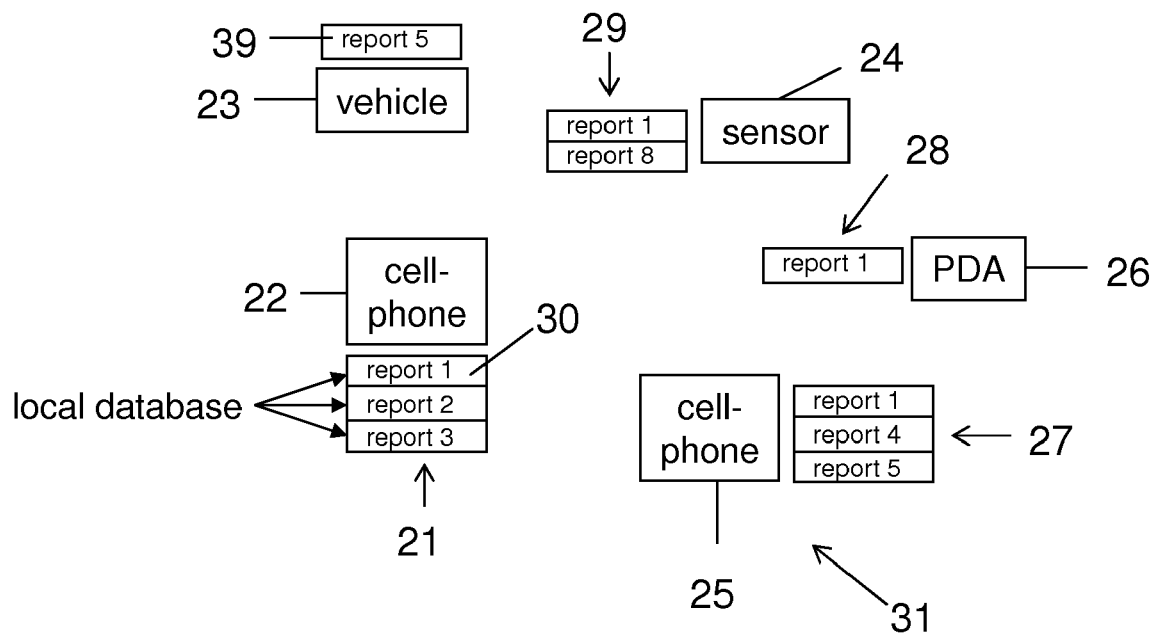
FIG. 2 shows a MANET database.

FIG. 2 shows a MANET database 31. The database is distributed among the peers 22, 23, 24, 25, 26 of the MANET. On each mobile peer 22, 23, 24, 25, 26 there is a local database 21, 39, 29, 27, 28 that stores and manages a collection of reports. A report (such as 30) is a set of values sensed by the peer, entered by the user, or otherwise obtained by a mobile peer. Often a report describes a physical resource such as an available parking slot.

All the local databases maintained by the mobile peers form the MANET database. The peers communicate reports and queries to neighbors directly, and the reports propagate by transitive multi-hop transmissions. This invention develops a MANET database without a central point of failure or reliance on servers. The database will be used to disseminate reports throughout the MANET. The heart of our invention is a distributed method that disseminates reports intelligently in an adaptive manner. Using this method, each mobile peer makes local decisions on when to disseminate reports, how many to disseminate, and which reports to disseminate. With the local decisions made by each individual peer, the whole MANET database maximizes the number and timeliness of reports disseminated to the mobile nodes, under the bandwidth, energy, and memory constraints.

In one embodiment, a mobile P2P system 31 is a set of mobile peers M={$M_1, M_2, \ldots, M_m$} (22, 23, 24, 25, 26) capable of computation, short range wireless communication (10-1000 meters, e.g. wifi), and possibly long range (cellular) communication. The short-range communication capability is associated with a transmission range r, which is the maximum physical distance between communicating peers. Peers that are within transmission-range are called neighbors.

Occasionally, a mobile peer $M_i$ such as 22 produces a report R such as 30 having some unique report-id, and a size s(R). Reports are transmitted between neighbors. Each exchange of reports occurs within a single hop, and although there is no explicit multi-hop routing of reports, a report can propagate by multi-hop transmissions. The report-id uniquely identifies the report. If may consist of the production time, location, id of the producing peer, and type of report.

Each peer $M_i$ such as 22 has a (local) reports database $RDB_i$ such as 21, which stores the reports that $M_i$ has produced or has received from neighbors (i.e., by P2P communication). The size limit of $RDB_i$ is $S_i$ bytes. When a report is produced or received by $M_i$, if space is sufficient, the report is stored in $RDB_i$. Otherwise, i.e. if space is insufficient, either the new report is not stored, or some reports are deleted from the database to accommodate the new report; the action taken depends on the storage management algorithm. We denote the global reports database RDB, i.e., $U_{i=1}^{m} RDB_i = RDB$. Thus, each $RDB_i$ is a subset of the reports in RDB. At any point in time, the content of different $RDB_i$'s may overlap, i.e., it is possible that $RDB_i \cap RDB_j \neq \phi$ for $i \neq j$.

At any point in time t, each peer $M_i$ such as 22 may have a query Q that represents the expertise of the peer. The query is continuous, i.e. the peer continuously requests the relevant reports. The query of $M_i$ is called the query internal to $M_i$, and $M_i$ is called its originator. A query which is not internal is external. $M_i$'s query is trivial if it is 'true', i.e. $M_i$ requests all the reports in the RDB.

We assume that the degree of satisfaction between a report R and a query Q, denoted Q(R), is a value between 0 and 1. If Q(R)>0 we say that R satisfies Q. Given a report R, if R satisfies $M_i$'s internal query, then $M_i$ is a consumer of R; otherwise $M_i$ is a broker of R. Thus, for different reports $M_i$ can be a producer, a consumer, and a broker at the same time. It can be a producer and a consumer of the same report.

In addition to reports, each $M_i$ also receives neighbors' queries. It accumulates them in a queries (or demand) database $QDB_i$ of $N_i$ bytes.

An encounter is the event in which a mobile peer $M_i$ first detects a new neighbor. As long as the neighbor stays within transmission range $M_i$ will not encounter it again, but it may do so after the neighbor disconnects.

Figure 3:
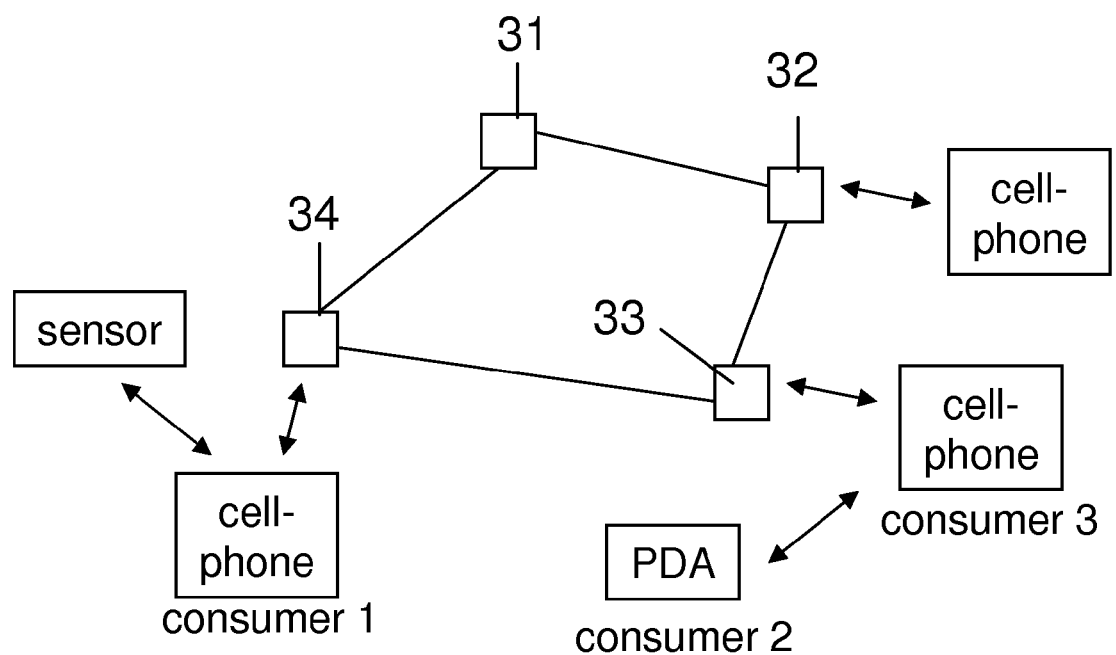
FIG. 3 illustrates a MANET database that augments the infrastructure.

FIG. 3 shows another embodiment of the invention in which the MANET database augments the infrastructure. The MANET database does not require a central server or a wireless infrastructure. However, when an infrastructure (such as a satellite, cellular or a helicopter-based network) is available, the MANET database can augment it to make the report dissemination more efficient. The cellular and MANET approaches can be combined into an architecture in which dissemination of reports in a MANET augments the infrastructure by covering the areas that are not covered by the infrastructure (e.g. elevators, subways, disaster areas), and it enhances and lowers the cost of report dissemination where offered by the infrastructure. In other words, the MANET approach can also be used to communicate among the mobile devices in a hierarchical cellular architecture, further enhancing the dissemination capability. In FIG. 3, rectangles 31, 32, 33, 34 are access points of a (possibly fixed) hierarchical infrastructure, each of which controls an area called a "cell". For example, the squares 31, 32, 33, 34 may represent cellular controllers.

Figure 4:
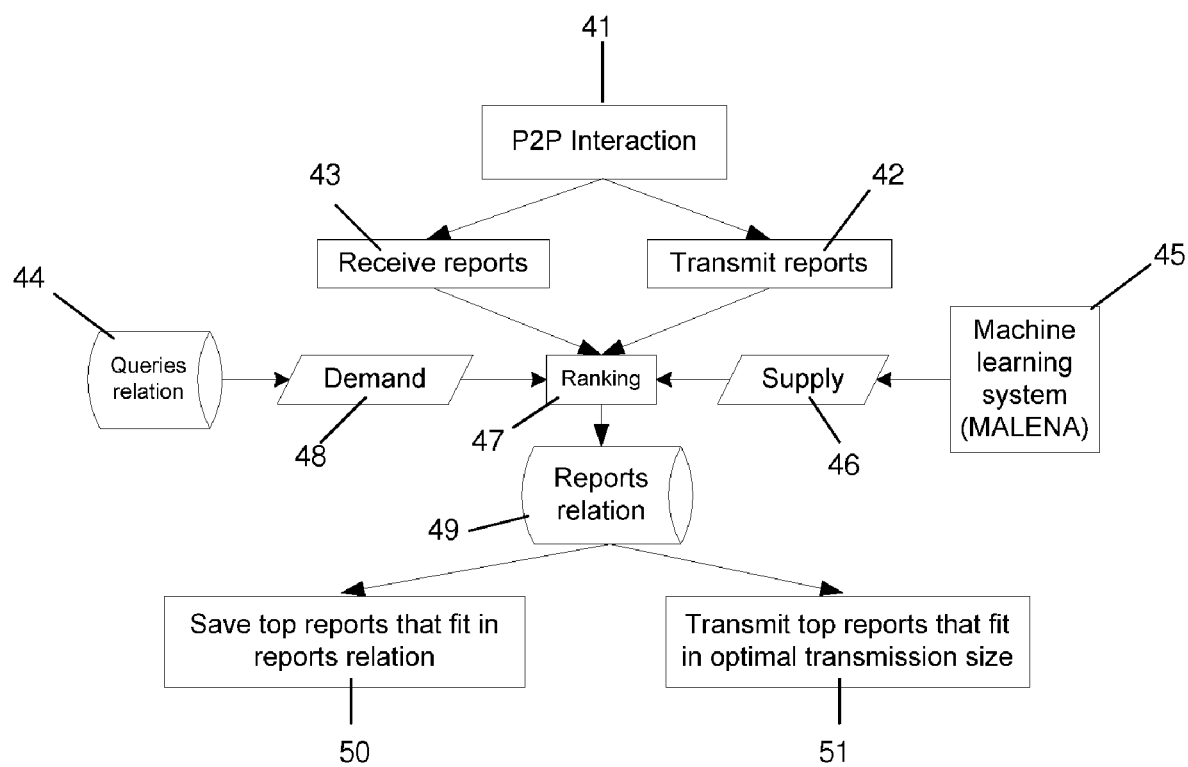
FIG. 4 is a flowchart of the MARKET algorithm at a peer.

FIG. 4 shows a high-level flowchart of the MARKET algorithm. Intuitively, the MARKET algorithm is an integration of multiple mechanisms that enable each mobile peer to receive as many query results and with as short response time as possible, under the bandwidth, energy, and storage constraints. These mechanisms include:

1. When to interact. The query processing executed by MARKET consists of a sequence of send-and-receive interactions 42, 43. There are two types of interactions. The first type is query-response (QR), which is triggered when a mobile peer encounters another mobile peer. The second type is relay, which is triggered when a mobile peer has new reports to disseminate. This dual-type mechanism makes MARKET automatically adapt to different mobility environments.

In a highly dynamic[2] and/or partitionable environment, MARKET disseminates reports mainly via the encounters (QR interactions); in a static environment (where there are rare encounters), MARKET disseminates reports mainly via proactive transmission of newly produced reports (relay interactions).

[2] Observe that there can be two reasons for an environment to be dynamic. One is high mobility. Another is high turn-over, namely the mobile peers frequently enter and exit the system.

2. How much to transmit during an interaction. Observe that during a P2P interaction a mobile peer may have a lot of reports to transmit but it may not be able to transmit all of them due to bandwidth and energy constraints. Thus the number of reports a mobile peer can transmit in an interaction is often limited. One way of determining it is to optimize the utilization of bandwidth and transmission energy. Intuitively, if the transmission size is too small, then the bandwidth is underutilized and the report dissemination suffers. On the other hand, if the transmission size is too big, then many collisions would reduce the number of successfully received reports. Thus there is an optimal transmission size 51 that achieves the best tradeoff between the bandwidth/energy utilization and transmission reliability.

This invention includes a method that determines the optimal transmission size of each mobile peer for each interaction. Using this method a mobile peer dynamically adjusts the transmission size based on the length of the period of time between consecutive P2P interactions, or the time period between consecutive interactions based on the transmission size, such that overall energy efficiency and bandwidth are maximized.

3. How to interact. A QR interaction has two phases. In the first phase, the encountering mobile peers exchange their queries and receive answers. In the second phase, they transmit reports that enhance the other peer's capability as a broker, i.e. reports that are in high demand but do not satisfy the received query. The reports are transmitted by broadcast so that the other neighboring peers may overhear the transmission, and thus their broker capability will also be enhanced. Thus, the QR interaction is a combination of one-to-one and broadcast communication, and the MARKET algorithm is a combination of report push and pull, in sense that the first phase of QR is pull, and "broker enhancement" and relay are push.

4. What to transmit during an interaction. Observe that since bandwidth is limited, not all the reports that satisfy the query or enhance the broker capability can always be transmitted. Thus, ranking 47 is used to determine which reports to transmit. The rank is also used by the receiving peer to accommodate the most popular reports in the limited space of the reports database.

Intuitively, the rank of a report depends on its size, demand 48 (how many peers are querying it), and supply 46 (how many peers already have it). For the estimation of demand, each mobile peer uses its demand database 44 as a sample of the global demand. For the estimation of supply, we use the MALENA algorithm 45.

5. What to save. Given the limited space of the reports database 49, a mobile peer saves the reports that have the highest broker-ranks (part 50). In other words, we assume that the answers received by the mobile peer are presented to the user, and possibly moved to the application area. Thus the reports saved in the reports database are solely for the purpose of brokering.

Reports Ranking by Supply and Demand

In a preferred embodiment, the broker-rank of a report R at a peer M depends on the following three factors.

1. The demand of R at time t, denoted demand(R,t), is the average degree to which R satisfies the query of a mobile peer in the system at time t. In other words, $$\text{demand}(R, t) = \frac{\sum_{i=1}^{m} Q_i(R)}{m} \quad (3.0)$$

where m is the number of peers in the system. (Remember that Q(R) is the degree of satisfaction between Q and R).

The demand-database is used as a sample for the estimation of this demand. Formally, let $Q_1, Q_2, \ldots Q_n$, be the queries in QDB (the demand database of M) at time t. demand (R,t) is estimated by demand(R,t,M), defined as follows.

$$\text{demand}(R, t, M) = \frac{\sum_{i=1}^{n} Q_i(R)}{n} \quad (3.1)$$

2. The supply of R at time t, denoted supply(R,t), is the probability that an arbitrary peer has received R before time t. This number is a global parameter that is normally unknown by each individual peer, but it can be evaluated by the peer based on metadata about R such as the number of times M received R.

3. The size of R, denoted size(R). The smaller size(R), the higher the rank of R; so to disseminate as many reports as possible.

The broker_rank of R at time t is $$\text{broker\_rank}(R, t) = \frac{\text{demand}(R, t) \cdot (1 - \text{supply}(R, t))}{\text{size}(R)} \quad (3.2)$$

The justification to the above ranking formula is given next.

We justify the rank formula (Eq. 3.2) by showing that it approximates an optimal solution to the NP-complete reports-selection problem.

Let U be a set of reports stored at a mobile peer M. When selecting a subset of reports (to save or transmit) out of U, it is desirable that the selection adds as much throughput as possible to an arbitrary peer encountered in the future.

demand (R,t)·(1−supply (R,t)), called the utility of a report R, gives the degree of satisfaction that R adds to an arbitrary peer O. The ranking by Eq. 3.2 approximates the optimal set of reports, i.e. the set of bounded size which most increases the degree of satisfaction of an arbitrary peer.

The reports selection (RS) problem is to construct a subset U' of U, such that the sum of the utility values of the reports in U' is maximized, subject to the constraint that the sum of the sizes of the reports in U' does not exceed T. Intuitively, U' includes more new answers to an arbitrary peer than any other subset of U that does not exceed the size limit T. The RS problem is easily transformed to the Knapsack problem and thus is NP-complete.

A preferred method uses Eq. 3.2 to construct an approximation solution to the RS problem. Since RS is NP-complete, we use an approximate solution to the problem, as follows.

Algorithm Greedy RS (or GRS): 1. Sort the set $U = \{R_1, R_2, \ldots, R_x\}$ by rank, so that broker_rank($R_1$,t)≧broker_rank ($R_2$,t)≧ . . . ≧broker_rank($R_x$,t). 2. Starting with U' empty, proceed sequentially through this list, each time adding $R_i$ to U' whenever the sum of the sizes of the reports already in U' does not exceed T−s($R_i$). 3. Compare the total utility of U' to the utility of the solution consisting solely of the report R with the maximum demand(R,t)·(1−supply(R,t)) value and whose size is smaller than T, and take the better of the two, i.e. the one with maximum total utility.

It can be proven that the absolute performance ratio of GRS is 2; namely, for any instance of the RS problem, the total utility of the solution produced by GRS is at least half of the optimal solution. The time complexity of GRS is dominated by sorting U and is O(nlgn); n is the cardinality of U.

A preferred method is used by each peer to save the queries of the latest peers encountered, i.e. the demand database is maintained by FIFO. An autonomous-demand-estimation-policy (or a demand-policy for short) is a function that, for any peer M with a demand database QDB, maps a time-stamped sequence of peers D: P1, . . . , Pn (representing the neighbors which M encountered from the start up to a time point, and the time of the encounter) to a subset S of the internal queries in D that fits in QDB (i.e. the total size of S does not exceed the size of QBD). A demand policy is FIFO if it maps each sequence of peers to a subset S of the queries such that: there exists a tail of P1, . . . , Pn, i.e. a k for which each Pj for j≧k has in S a query that was internal at the time of interaction. Intuitively, a demand policy selects from the peers with which M interacts, a subset of the queries to estimate the demand. And if a peer M uses a FIFO demand policy, then M selects the queries to estimate the demand from the last peers which M encountered.

Another preferred method sets the size of the demand database. If we treat the demand database of a peer M (i.e., QDB) as an arbitrary sample of the queries in the system, it can be shown that the deviation of Eq. 3.1 from demand(R,t) is bounded as follows. For an arbitrary number Δ, $$Pr\{|\text{demand}(R,t,M) - \text{demand}(R,t)| \leq \Delta\} > 1 - 2e^{-2n\Delta^2} \quad (3.3)$$

The equation says that the probability that [the difference between the demand(R,t,M) and demand(R,t) is smaller than Δ] is greater than $1-2e^{-2n\Delta^2}$. The right-hand side of Eq. 3.3 is the confidence level. By setting it to the desired value, and setting Δ to the desired confidence interval width, we can solve for n. For example, if the desired confidence level is 95% and the confidence interval width is Δ=0.08, then n should be set to 108. In this case the difference between demand(R,t,M) and demand(R,t) is smaller than 0.08 with probability 0.95. Suppose that the average query size is 100 bytes. Then the size of QDB should be set to 108×100≈10 K bytes.

Yet another preferred method estimates the supply by machine learning. Consider the time when a peer O assigns a rank to a report R. We postulate that the probability that R will be new to the peers that will be encountered in the future by O depends on several elements called novelty indicators. Following are two possible novelty indicators.

1. The relative order in which R arrives at O. This indicator is called the fifo-rank. Specifically, if R is the k-th report that arrived at O (among all the reports in the current database), then the fifo-rank of R is k. Clearly 1≦fifo-rank≦$M_O$ (Recall that $M_O$ is the number of reports in O's database). A small fifo-rank suggests that R has been in the database for a relatively long time and thus has probably been in the system longer, and also has been transmitted by O more times than other reports. Therefore a small fifo-rank would indicate a low probability of future novelty.

2. The number of times R has been received by O from other peers, denoted by counter-rank. The higher the counter-rank, the less likely that R is new to O's future encountered peers, since this means that R has already been widely disseminated by other peers.

This set is by no means exhaustive. One can easily come up with other novelty indicators, such as the number of hops R has traveled before it reaches O, the number of times R has been transmitted by O, the age of R, etc. However, the method developed in this invention is able to integrate these and other indicators. Moreover, we considered other indicators and found that fifo-rank or counter-rank is superior for the environments examined in this invention.

Given a report R at a peer at a particular time, the pair (fifo-rank, counter-rank) is called the Novelty Indicator Vector (NIV), of R.

A preferred framework uses machine learning techniques to predict the novelty probability based on a novelty indicator vector. This is a general framework in the sense that different ML systems can be plugged in it.

ML Intuitive Framework: Suppose that we are given a multiset ES of examples[3], where each example is a pair (X, label). X is a NIV and label is either "new" or "old". "new" indicates that the report associated with the NIV X was new at the receiving peer (i.e. the peer has never received the report before). And similarly, "old" indicates that the associated report was not new.

[3] The same example may appear multiple times in the set.

A machine learning system Q is a function of the examples set ES and a NIV X. Particularly, Q(ES, X) returns the probability that a report with NIV X will be new to encountered peers in the future, given the examples set ES.

The examples set ES is collected as follows. When a report R is transmitted, the sender attaches to R the NIV of R that is maintained by the sender. For each received report, the receiver determines whether it is new to the receiver, and the respective NIV, along with the label 'new' or 'old', becomes an example in the receiver's ES set.□

Old/new labeling and the Tracking Set: Now we elaborate on the old/new labeling of the examples collected by the above framework. Observe that a report may be received, then purged from the database, then received again. It would be false to label the report 'new' in the second receipt. But this is exactly what O would do if the label is determined by simply considering the database. Thus, O keeps a tracking set, in which each entry is the report-id (i.e., the unique identification) of a report that has been received at O. An entry in the tracking set survives even when the corresponding report is purged from the database. And when a report is received, its report-id is searched in the tracking set for labeling, and thus "false" labeling is avoided.

Observe also that the size of each entry in the tracking set is only a few bytes, thus the tracking set can contain many more tuples than the database. Furthermore, as we discuss later, the size of the tracking set can be bounded.□

In summary, the MAchine LEarning based Novelty rAnking (MALENA) system distinguishes among four sets of tuples pertaining to reports. The tracking set described above pertains to all the reports ever received by a peer; the database contains the reports that are currently stored by the peer, which in turn is a subset of a tracking set; the transmission set is the subset of the database which is transmitted in an encounter. Peer O also keeps the set ES of all the examples O has received. The first three sets are demonstrated in FIG. 5, and the examples set is demonstrated in FIG. 6. As we will see later when we plug in the Bayesian machine learning system, O actually only needs to remember a limited amount of aggregate data about ES (e.g. the number of "new-report" examples that have been received), without remembering any actual example in ES.

Figure 5:
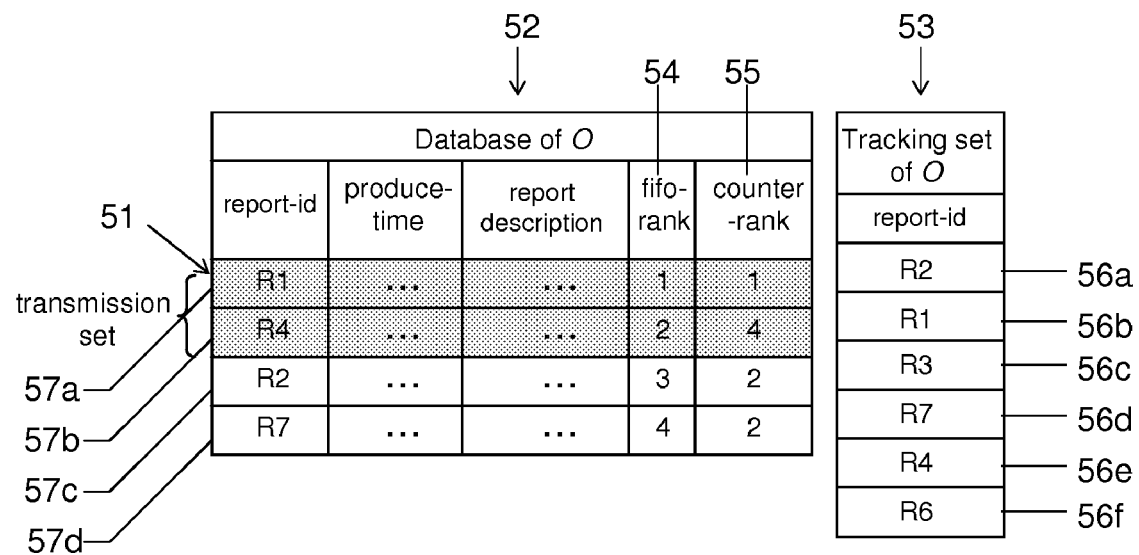
FIG. 5 shows three sets of tuples (Database, Tracking set, Transmission set) maintained in a peer for machine-learning of supply.

FIG. 5 shows the three sets of tuples (Database, Tracking set, Transmission set) maintained in a peer O for machine-learning of supply. The database 52 contains the reports 57a, 57b, 57c, 57d that are currently stored by the peer O, which in turn is a subset of a tracking set 53; the transmission set 51 is the subset of the database 52 which is transmitted in an encounter. The tracking set 53 is a set of entries 56a, 56b, 56c, 56d, 56e, 56f where each entry is the report-id (i.e., the unique identifications) of a report that has been received at O.

The MALENA method can best be understood by those of ordinary skill in the art if expressed as pseudo-code. The pseudo-code set forth below in Table 1 describes the currently preferred embodiment of the invention. Other embodiments are readily apparent to those skilled in the art.

TABLE 1

Pseudo-code of the MALENA method

Method MALENA, executed at a peer O, when O encounters another peer A
Input: $DB_O$ - the database at O
$TS_O$ - the tracking set at O
Q - the machine learning system at O
k - the size of the transmission set to be sent by O. // We assume that all the reports have the same size. The value of k is determined by the bandwidth/energy allocation and the report size. The method easily extends to the case in which the report size is variable.
$M_O$ - the size of the database at O
G - the transmission set received from A
Output: F - transmission set sent from O
$DB_O$ - updated database at O
1. for each R in $DB_O$, compute the novelty probability of R using Q
2. F ← topK($DB_O$, k)
// Sort the reports in $DB_O$ in decreasing order based on their novelty probabilities.
// Select the top k reports (i.e. k reports with highest probabilities).
3. Transmit the reports in F and their NIV's to A
4. Receive G the transmission set from A in exchange
5. for each R in G, do fifo-rank ← fifo-rankm, where fifo-rankm = 1+(the current maximum fifo-rank in $DB_O$).
6. for each report R and its NIV X received from A, do
   a. Create an example (X, label) where label is "new" if the report-id of R does not exist in $TS_O$, and "old"
   otherwise.
   b. INSERT_EXAMPLE((X,label)) // Add the example (X, label) to the examples set.
   c. if R is new to O, then
   Create an entry (R's-report-id, Y) in TSO, where Y is the NIV: (fifo-rankm, counter-rank=1)
   else // R is not new to O
   d. Update the NIV of R in $TS_O$ by increasing its counter-rank by 1.
7. $DB_O$ ← topK($DB_O$∪G, $M_O$)
// Sort the reports in G together with the reports in $DB_O$,
in decreasing order of their novelty probabilities (computed by the machine learning system Q; see the intuitive framework afore described); save the top $M_O$ reports in $DB_O$. Reports in G that are labeled as "old" in step 6 are discarded directly, without participation in sorting.
8. The fifo-ranks of the reports in $DB_O$ are adjusted to start from 1 and to eliminate the gaps created by the reports that did not fit in $DB_O$.

INSERT_EXAMPLE is implemented by the machine learning system Q and it is where Q is actually trained. After the INSERT_EXAMPLE is finished, (X, label) is discarded. The INSERT_EXAMPLE procedure for Bayesian learning will be described shortly. The time complexity of INSERT_EXAMPLE is a constant. Assuming that the tracking set is accessed by using a hash table, step 6 can also be executed in constant time. Thus the complexity of the MALENA method is dominated by the sorts in steps 2 and 7, and is O(MlgM), where M is the number of reports in the database.

Two preferred methods bound the size of the tracking set, namely global-DB-size and report life-span. Recall that the purpose of the tracking set is to prevent incorrect labeling of received reports.

The storage allocated to the tracking set can be bounded by keeping the tracking information for only the T (to be defined below) most recently received reports, and discarding the others. Intuitively, if a report R has already been purged by all the peers from their database, then R will not be received again, so there is no risk of incorrect labeling. Thus, in this case there is no reason to keep the tracking information for R. We set T to be N·M, where N is the number of peers in the system, and M is the average database size among these peers. We postulate that having the size of the tracking set bounded by N·M should work almost as well as the infinite tracking set, because N·M gives the maximum number of distinct reports that can currently exist in the system. This postulate has been verified by our preliminary experiments. We refer to this method as global-DB-size, as N·M gives the size of the global database (the union of the databases of at each peer).

In the scenarios where N and M are not known, a method, called report life-span, bounds the tracking set. The idea of the report life-span method is that O removes a report R from the tracking set when the life-span of R ends, i.e. when R has been purged by all the peers from their database. Obviously this time is not known by an individual peer O, but intuitively, O assumes that the life span of R ended when O has not received R from other peers for a long enough time. More precisely, the life-span of R is estimated based on the history of R in O's own database plus an extension period. Specifically, each entry R of the tracking set contains an element called the expiration time. The expiration time is O's estimate of R's life span. When the expiration time of R arrives, R is removed from the tracking set. The expiration time is updated as follows. When an entry R is added to the tracking set, its expiration time is initialized to be infinite. When R is purged from O's database, say at time now, the expiration time of R is updated to be R's-produce-time+(now−R's-produce-time)*2. Recall that produce_time is the time at which R is produced. In other words, the life-span of R is initially estimated to be: (the period of time starting when R is produced and ending when R is purged from O's database)*2. Each time R is received again, if R is still in the tracking set, then the expiration time of R is updated in the same fashion. Namely the expiration time of R is updated to be R's-produce-time+(now−R's-produce-time)*2 where now is the time at which R is received again (Observe that R is not going to be saved by O in the database according to step 7 of the MALENA method). In other words, the life time of R is estimated to be twice the period of time starting when R is produced, and ending when R is last received by O.

Observe that in the report life-span method we implicitly assume that the clocks of all the mobile peers in the system are synchronized. In practice clocks can be synchronized through a clock synchronization protocol, or through the GPS units attached to the mobile peers (if equipped with), or through the cellular infrastructure (if the mobile peer is cellular enabled).

In an embodiment of the invention, the Bayesian system is employed as an instantiation of the machine learning system Q used by the MALENA method. The system can be plugged into the MALENA method for training (step 6) and reports ranking (steps 2 and 7).

At a high level, the Bayesian learning system maintains a set of counters (e.g., the number of "new-report" examples with a particular (fifo-rank, counter-rank) pair). When an example is added, these counters are updated. When invoked for ranking, the system uses these counters to compute the probability that a report will be new to a peer encountered in the future.

Now we describe the Bayesian learning system in further detail. The description focuses on the case where the NIV consists of only two indicators, (fifo-rank, counter-rank), because our experiments have shown that adding more indicators will not change the performance significantly; and on the other hand it increases resource consumption, and complicates learning significantly.

The probability that a report is new given its NIV (fifo-rank, counter-rank) is:

$$p(\text{new} \mid (\text{fifo\_rank, counter\_rank})) = \frac{C_{new}(\text{fifo\_rank, counter\_rank})}{C(\text{fifo\_rank, counter\_rank})} \quad (A)$$

where C(fifo-rank, counter-rank) is the number of examples for which the NIV equals to (fifo-rank, counter-rank) and $C_{new}$(fifo-rank, counter-rank) is the number of "new-report" examples for which the NIV equals to (fifo-rank, counter-rank).

The novelty probability of a report with NIV (fifo-rank, counter-rank) is then taken to be p(new|fifo_rank,counter_rank) which is computed according to formula A.

Given an example ((fifo-rank, counter-rank), label), the INSERT_EXAMPLE procedure increases C(fifo-rank, counter-rank) by 1; and if the label of the example is 'new', then $C_{new}$(fifo-rank, counter-rank) is also increased by 1. Thus, assuming that the counters of an (fifo-rank, counter-rank) pair are accessed using a hash table, the time complexity of the procedure is constant.

Figure 6:
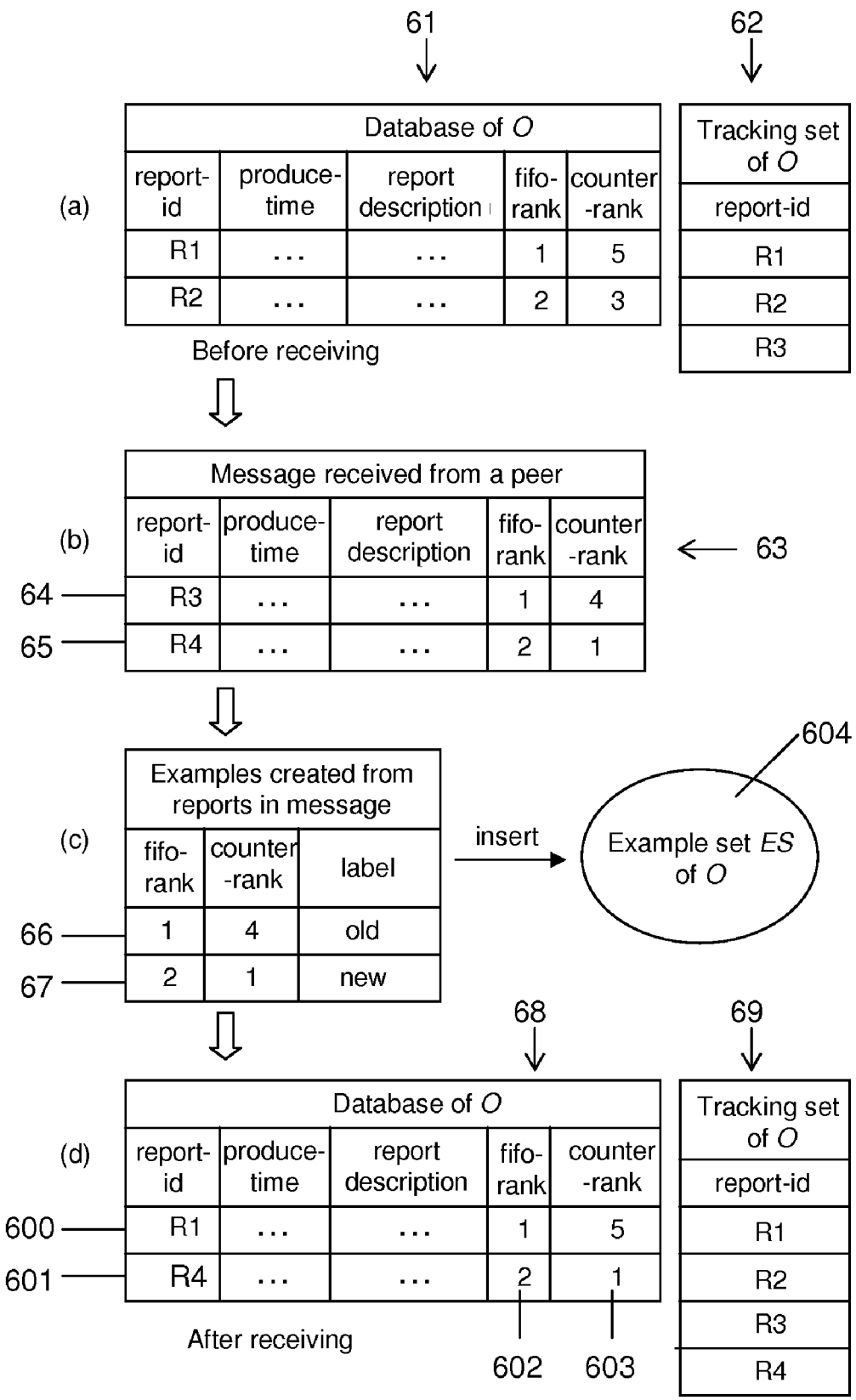
FIG. 6 shows an example for the MALENA method executed at a peer.

FIG. 6 illustrates the execution of the MALENA method at a peer O. (a) shows the database 61 with a capacity of two reports, and the tracking set 62 of O before it receives a transmission. At (b) O receives a transmission 63 from a neighbor which includes two reports R3 64 and R4 65. At (c) O creates two examples from the received transmission 63 and inserts them to O's example set 604. The NIV 66 of R3 64 is labeled as "old" because O has received R3 64 before, as indicated by its tracking set 62 at (a). The NIV 67 of R4 65 is labeled as "new" because O has never received R4 65 before. Observe that the example ((1,4), old) is created from R3 64 in the message, not from the R3 stored in O's database. For Bayesian machine learning the examples set is simply a set of counters as. (d) shows the database 68 and tracking set 69 of O after the MALENA method ends. Notice that the counter-rank 603 of R4 601 is set to be 1. The fifo-rank 602 of R4 601 is 2 since there are only two reports in O's database, and R4 601 arrives later than R1 600.

The Throughput of a Broadcast in a MANET

FIG. 7 shows a formula 701 for computing the throughput of a broadcast. In one embodiment, the formula can be used by a mobile peer to dynamically adjust the transmission size depending on the period of time between two transmissions to other mobile peers. In another embodiment, the formula is used by a mobile peer to dynamically adjust the period of time between two transmissions to other mobile peers, depending on the transmission size. Consider a broadcast of k bytes (of reports/queries) by a peer x. The formula 701 computes the expected number of bytes that are received without interference (collision) at a neighbor of x.

One embodiment targets MANET's that use a carrier-sense multiple access (CSMA) protocol, e.g. 802.11. In such a network time is divided into slots, mobile peers communicate by broadcasts, and each broadcast lasts an integral number of time slots. For example, the length of the 802.11b time slot is 20 μs.

The reception of a broadcast from a mobile peer x at a neighbor y is said to be successful if y receives the message from x without incurring any interference generated by transmissions from other neighbors of y during the broadcast. If another neighbor of y transmits during some time slot of the broadcast, then a collision occurs, and the whole broadcast is considered corrupt at y. We assume that p' is the probability that a mobile peer starts transmitting at an arbitrary time slot. In a CSMA protocol, a peer starts transmitting at a time slot if it attempts to transmit and succeeds, i.e., the peer senses the channel and finds it free.

Let F be the number of neighbors that successfully receive the message from x. The throughput of the broadcast by x (denoted Th) is defined to be: Th=k·F. Intuitively, the throughput is the total number of bytes successfully received by neighbors of x.

TABLE 2

Summary of symbols used in computing the throughput.

| Symbol | Meaning |
|---|---|
| λ | The number of mobile peers per each unit of the MANET area (we assume uniform spatial distribution). |
| r | Transmission range of each mobile peer in meters. |
| b | Data transmission speed in bits per second. |
| Th | Throughput of a broadcast. |
| k | Number of bytes in each broadcast. |
| p' | The probability that a mobile peer starts a broadcast at an arbitrary medium access time slot. |
| τ | Length of the medium access time slot in seconds. |
| h | Size of Medium Access Control header in bytes. |

Let a peer x execute a broadcast at an arbitrary time slot. Under the assumptions and notations given in Table 2, Th, the throughput of the broadcast is a random variable with an expected value given by formula 701.

Basically, the contribution of formula 701 is that it expresses F in the definition of the throughput in terms of the environmental parameters given in Table 2, i.e., h, b, etc. As mentioned earlier, we call formula 701 the Good Citizen (GC) formula.

In one embodiment, the GC formula is used by a mobile peer to dynamically adjust the transmission size depending on the period of time between two transmissions to other mobile peers. Specifically, in the GC formula, if τ, p', λ, h, b, and r are fixed, then the throughput Th as a function of the broadcast size k is a bell curve. Intuitively, when k is very small, the throughput of the broadcast is small because the wireless channel is underutilized. As the broadcast size increases, the wireless channel is better utilized; but at the same time the probability of collisions increases, because the broadcast does not use handshakes to avoid or detect collisions as unicast does. Thus there is a value of k that maximizes the throughput, i.e. achieves the best tradeoff between the channel utilization and broadcast reliability. And this value is computed and used by the MARKET algorithm.

In practice, except for k, all the parameters of the GC formula can be determined by a mobile peer. The parameters τ, h, r, and b depend on the network, and are fixed for a given communication network technology. For example, h is 47 in 802.11b. The density λ can be determined by a peer O in various ways. For example, each mobile peer periodically handshakes with each one of its neighbors and counts the number of neighbors, or O has a pre-loaded table in which each entry gives the peer density at each geographic area at each time period (e.g. rush hour).

The probability p' is determined as follows. If every mobile peer broadcasts every c seconds on average, then for every mobile peer the broadcast probability in each medium access time slot is τ/c. Thus we substitute the broadcast probability p' in the GC formula by τ/c. For example, if c=5 seconds and τ=20 μs, then $$\frac{20 \times 10^{-6}}{5} = 4 \times 10^{-6}.$$

In another embodiment, the GC formula is used by a mobile peer to dynamically adjust the period of time between two transmissions to other mobile peers, depending on the transmission size. Specifically, the mobile peer estimates the broadcast period i, i.e. the period between two successive broadcasts. This is done as follows. Let c be a fixed broadcast period. Let E(Th) be the expected value of the throughput of a broadcast (see formula 701). The throughput rate, denoted by ThR, is $$\frac{E(Th)}{c}.$$

Intuitively, the throughput rate is the number of reports successfully received by neighbors of a moving object per time unit. According to formula 701, we have formula 702. In formula 702, for given τ, λ, h, b, M, r, and k, there is a value of c that maximizes ThR (recall that $$p' = \frac{\tau}{c}\bigg).$$

And this value is computed and used as the broadcast period.

Description of the MARKET Algorithm

Figure 8:
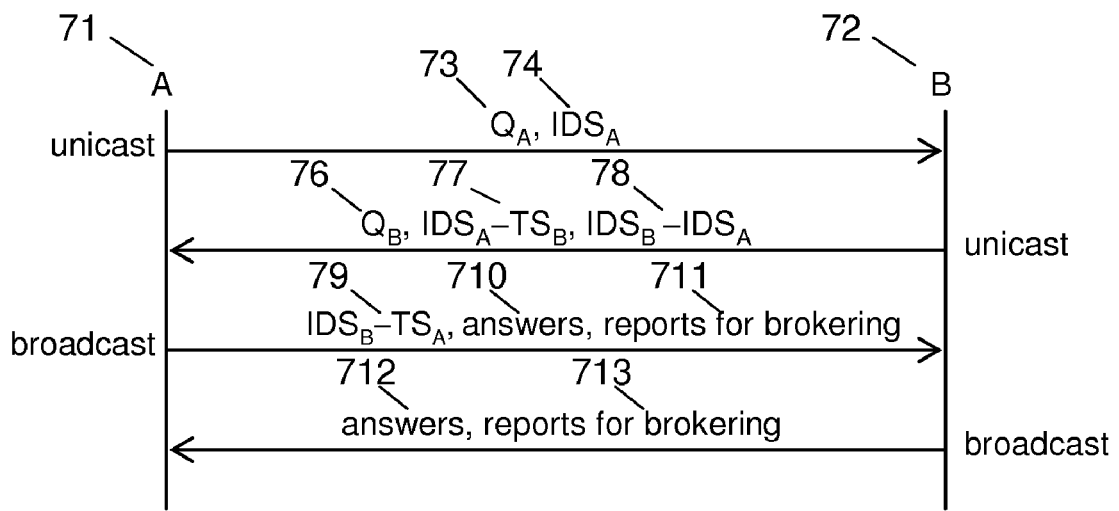
FIG. 8 shows a sequence diagram of the QR interaction in the MARKET algorithm.

FIG. 8 shows a sequence diagram of the QR interaction. In a preferred embodiment, the MARKET algorithm consists of two interactions, QR and Relay. The QR interaction is initiated by a mobile peer A 71 when A encounters a neighbor B 72. Recall that encounter is defined to be the event in which A detects B as a new neighbor. Thus no QR interaction is triggered for existing neighbors (i.e., the mobile peers that stay within transmission range). The relay interaction is initiated by A at a fixed time interval after the latest interaction[4] (relay or QR).

[4] We take the time-interval to be 5 seconds; then, if no broadcast is executed within the last 5 seconds relay is initiated.

The QR interaction can best be understood by those of ordinary skill in the art if expressed as pseudo-code. The pseudo-code set forth below in Table 3 describes the currently preferred embodiment of the invention. Other embodiments are readily apparent to those skilled in the art.

TABLE 3

Pseudo-code of the QR interaction in MARKET.

Procedure: Query-response, executed at peer A 71 when A encounters a peer B 72.
Input:     $Q_A$ and $Q_B$ are the internal queries of A and B respectively
           $IDS_A$ is the set of the id's of the reports in $RDB_A$
           $IDS_B$ is the set of the id's of the reports in $RDB_B$
           $TS_A$ and $TS_B$ are the tracking sets maintained by A and B respectively
Process: 1. Send $Q_A$ 73 and $IDS_A$ 74 to B by unicast.
// By this step A informs B what A wants ($Q_A$) and what A has to offer ($IDS_A$).
2. Receive $Q_B$ 76, $IDS_A$–$TS_B$ 77, $IDS_B$–$IDS_A$ 78 from B.
// By this step A knows what B wants ($Q_B$), what B does not know ($IDS_A$–$TS_B$), and what B has to offer ($IDS_B$–$IDS_A$).
3. Put $Q_B$ 76 in the demand database $QDB_A$.
// $QDB_A$ is FIFO-maintained.
4. Invoke MALENA to create examples and train the machine learning system.
// The reports referred to by $IDS_A$-$TS_B$ are new to B, and those referred to by $IDS_A \cap TS_B$ (i.e., $IDS_A$–($IDS_A$–$TS_B$) are old to B.
5. Compute K, the transmission size, using the GC formula.

TABLE 3-continued

Pseudo-code of the QR interaction in MARKET.

6. Fill up a message of K bytes in the following order:
   a. $IDS_B-TS_A$ 79 // This is the set of the id's of the reports in B's reports database that are new to A.
   b. the reports 710 in $RDB_A$ that satisfy $Q_B$ and their id's are in $IDS_A-TS_B$ (these are the answers to $Q_B$ that are unknown to B).
If all the reports in this category do not fit in the message, they are selected in descending order of $Q_B(R)/size(R)$. (GRS)
   c. other reports 711 in $RDB_A$ whose id's are contained in $IDS_A-TS_B$ (these are the broker-enhancement reports). If
all the reports in this category do not fit in the message, then the GRS algorithm is executed to select the reports to include in the message.
7. Broadcasts the K-bytes message.
8. Symmetrically, A receives reports 712 713 from B and puts them in $RDB_A$. If the size of $RDB_A$ is bigger than $S_A$ (Recall that $S_A$ is the size limit of $RDB_A$), then the GRS algorithm is executed to select the reports for saving.

If the QR interaction does not complete before B moves out of the transmission range of A, then the interaction is simply stopped. No rollback is needed. If A encounters another peer C during its QR interaction with B, the QR interaction with C will be delayed until the QR interaction with B finishes.

Figure 9:
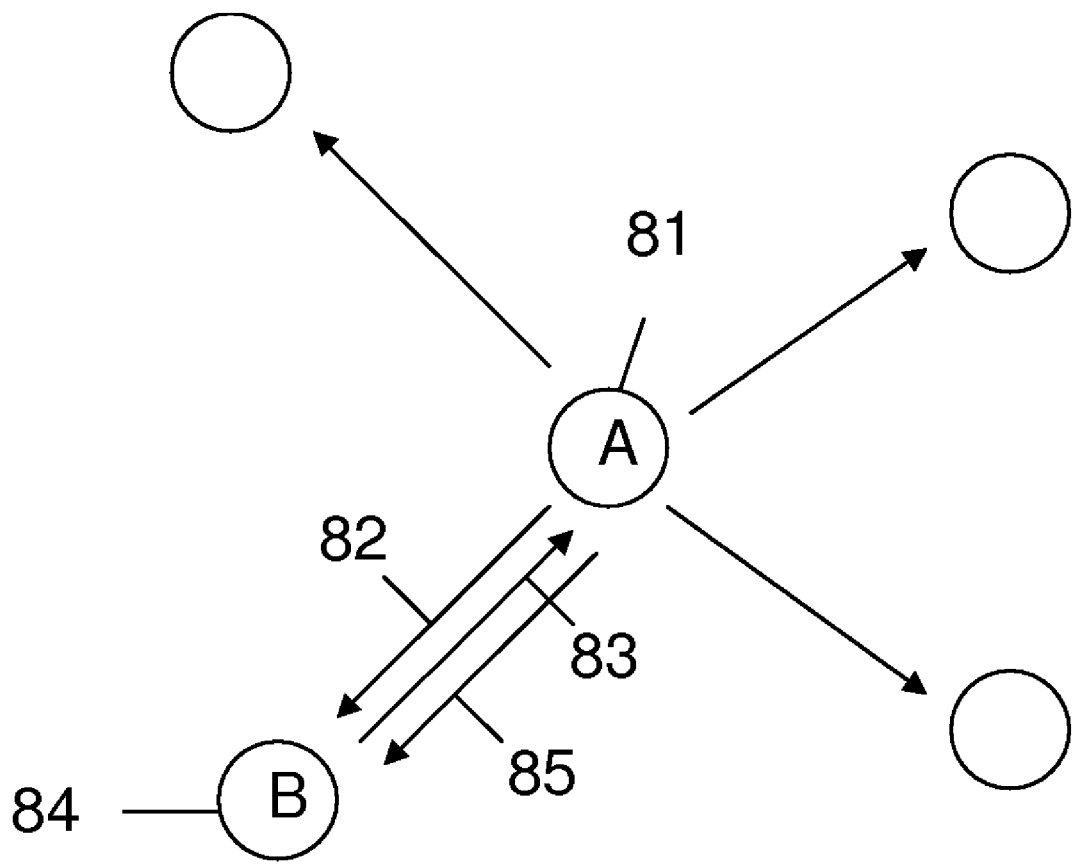
FIG. 9 shows an exemplary embodiment of the relay interaction in the MARKET algorithm.

FIG. 9 shows an exemplary embodiment of the relay interaction. Basically, the relay interaction is obtained by taking the SPIN protocol ([7]) and extending it with bandwidth optimization. The SPIN protocol is initiated when a mobile peer A 81 receives new reports. It starts by A broadcasting an advertisement message 82 which contains the id's of the received reports. Upon receiving the advertisement message, a neighboring peer B 84 checks to see if it has already received the advertised reports. If not B responds by sending a request message 83 for the missing reports back to A. The protocol completes when A responds to B with a message 85 that contains the missing reports.

We describe the relay interaction performed at a mobile peer A as two procedures respectively, depending on whether A participates in the interaction as the sender or as a receiver. The pseudo-code set forth below in Table 4 and Table 5 describes the currently preferred embodiment of the invention. Other embodiments are readily apparent to those skilled in the art.

TABLE 4

Pseudo-code of the relay interaction as sender in MARKET

Procedure: Peer A participates as the sender in the relay interaction
Process: 1. If A does not have any neighbor, then the relay interaction ends. Otherwise compute X, the set of reports $RDB_A$ that have not been previously transmitted by A.
2. Compute K, the transmission size, using the GC formula.
3. Fill up MSG, a message of K bytes, with the reports in X; the reports are selected in their rank order, using the GRS algorithm.
4. Construct ADV a message that includes the id's of the reports in MSG. Broadcasts ADV.
5. Receive the request (if any) sent from any neighbor. (Such a request is received if the neighbor is interested in any report identified in ADV).
6. Broadcast MSG if at least one request is received. Observe that the whole set of reports is broadcasted if at least one request is received; the request does not specify a set of report id's.

At step 1 of the above procedure, X includes the new reports received by A since the last interaction (relay or QR) and currently in A's reports database. X also includes the reports received before the last interaction but never transmitted by A (because they were never selected in QR step 6, or in any relay interaction initiated by A).

TABLE 5

Pseudo-code of the relay interaction as receiver in MARKET

Procedure: Peer A participates as a receiver in the relay interaction
(A receives from B)
Input:    $TS_A$ is the tracking set maintained by A
          ADV is the advertisement message sent from B
Process: 1. Wait for a random time between 0 and 1 millisecond.
2. If a request responding to ADV is heard from any other peer, the interaction ends. Otherwise, if ADV includes the id's of any reports that are not in $TS_A$, then send to B an REQ message; the message indicates that A wants to receive the reports identified in ADV.
3. Receive these reports from B and put them in $RDB_A$. If the size of $RDB_A$ is bigger than $S_A$, then the GRS algorithm is executed to select the reports for saving.

At step 1 of the above procedure, A waits for a random time (called jitter) before responding to ADV. There are two purposes of doing this. The first purpose is to avoid collisions created when multiple receivers respond to ADV at the same time. The jitter allows one neighbor to obtain the channel first, while other neighbors detect that the channel is busy and consequently back-off. The second purpose of jittering is to provide a chance for A to overhear the response from its neighbors and suppress its own.

Long-Range Communication Via Access to the Infrastructure (Cellular or Internet)

Figure 10:
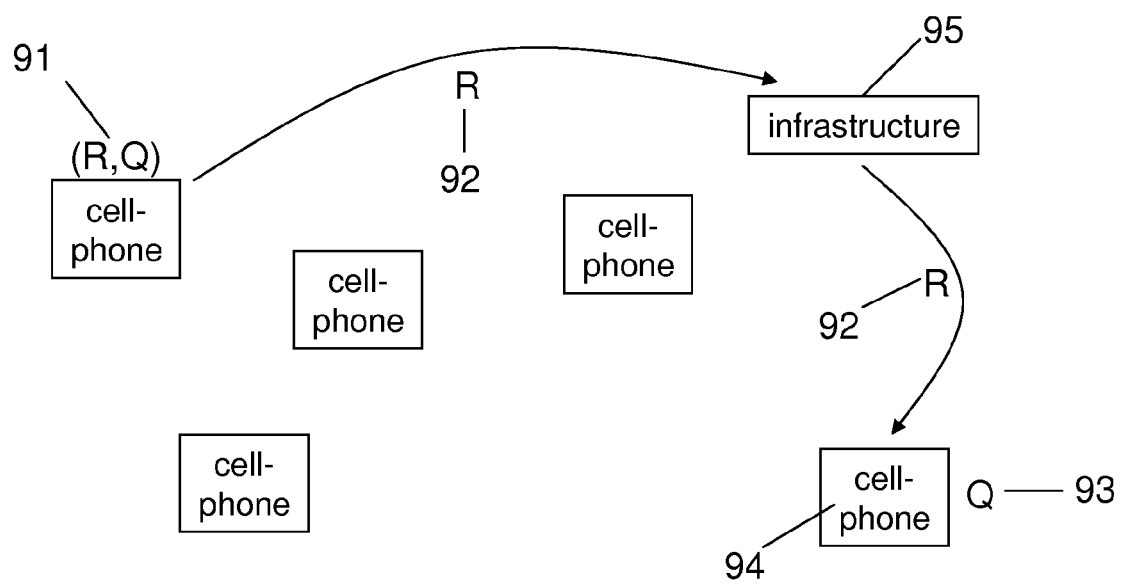
FIG. 10 shows an embodiment in which an infrastructure serves as a backchannel to deliver answers.

FIG. 10 shows an embodiment in which an infrastructure serves as a backchannel to deliver answers. In some environments, e.g. in an urban area, in addition to short-range P2P communication, some mobile peers can also communicate over long distances using a fixed cellular infrastructure. Observe that the availability of an infrastructure does not imply the existence of a data server for the reports. In other words, the existence of an infrastructure does not eliminate the need for a mobile P2P data management scheme such as MARKET. Instead, the fixed infrastructure (i.e., the backchannel) can be exploited to augment the P2P reports dissemination. The general idea is that reports and queries are disseminated by a mobile P2P algorithm such as MARKET, and thus a match between a query and a report may be discovered and an intermediate peer (a broker 91, (R,Q) in FIG. 10). If the query Q 93 carries the network-id of the query-originator 94, then the broker 91 can send R 92 to 94 via the infrastructure 95. We refer to this variant of MARKET as MARKET+Backchannel.

Observe that in MARKET+Backchannel, the same matching report may be discovered at different brokers and these brokers send the same answer to the same query originator via backchannel independently. Furthermore, the query originator may have already received the matching report via the P2P transmission. A straightforward way to reduce duplicate backchannel transmissions via negotiation; namely, the broker sends the report-id to the query originator via the backchannel, and the report is sent only if the query originator replies with a request.

Duplicate backchannel communication could also be reduced by initiating the backchannel communication only when the matching report is likely to be new (i.e., unknown) to the recipient. This decision can be made by machine learning, similarly to the way the novelty probability of a report is evaluated in the MALENA method.

Negotiation and backchannel machine learning can be combined in the following way. Suppose that the novelty probability is 0.25, and the size of the report message is x. Thus if a report matches a query, it is transmitted or negotiated according to the formula: min(x, cost-of-negotiation+0.25*

(x−size-of-report-ID))). If the first member, i.e. x, is smaller, then the broker transmits the report without negotiation; if the second member is smaller, then the broker first transmits the report, and then, if requested, the report. In the last formula, the cost may be measured in terms of energy or $.

In this scheme, a peer is willing to pay at least the negotiation cost for every remote match that is found, regardless of the probability that the match is new. Alternatively, the originator can attach a threshold-probability to the query, indicating that if the novelty probability is below the threshold, then it should not be notified of the search.

The MARKET+Backchannel algorithm can best be understood by those of ordinary skill in the art if expressed as pseudo-code. The pseudo-code set forth below in Table 6, Table 7, and Table 8 describe the currently preferred embodiment of the invention. Other embodiments are readily apparent to those skilled in the art.

TABLE 6

Pseudo-code of the QR interaction in MARKET + Backchannel

Procedure: Query-response with backchannel, executed at peer A when A encounters a peer B.
Input: $Q_A$ and $Q_B$ are the internal queries of A and B respectively
$IDS_A$ is the set of the id's of the reports in $RDB_A$
$IDS_B$ is the set of the id's of the reports in $RDB_B$
$TS_A$ and $TS_B$ are the tracking sets maintained by A and B respectively
Process: 1. Send $Q_A$ and $IDS_A$ to B by unicast.
// By this step A informs B what A wants ($Q_A$) and what A has to offer ($IDS_A$).
2. Receive $Q_B$, $IDS_A$−$TS_B$, $IDS_B$−$IDS_A$ from B.
// By this step A knows what B wants ($Q_B$), what B does not know ($IDS_A$−$TS_B$), and what B has to offer ($IDS_B$−$IDS_A$).
3. Put $Q_B$ in the demand database $QDB_A$.
// $QDB_A$ is FIFO-maintained.
4. Invoke MALENA to create examples and train the machine learning system.
// The reports referred to by $IDS_A$−$TS_B$ are new to B, and those referred to by $IDS_A \cap TS_B$ (i.e., $IDS_A$−($IDS_A$−$TS_B$)) are old to B.
5. Compute K, the transmission size, using the GC formula.
6. Fill up a message of K bytes in the following order:
   a. $IDS_B$−$TS_A$ // This is the set of the id's of the reports in B's reports database that are new to A.
   b. the reports in $RDB_A$ that satisfy $Q_B$ and their id's are in $IDS_A$−$TS_B$ (these are the answers to $Q_B$ that are unknown to B). If all the reports in this category do not fit in the message, they are selected in descending order of $Q_B(R)$/size(R). (GRS)
   c. other reports in $RDB_A$ whose id's are contained in $IDS_A$−$TS_B$ (these are the broker-enhancement reports). If all the reports in this category do not fit in the message, then the GRS algorithm is executed to select the reports to include in the message.
7. Broadcasts the K-bytes message.
8. Symmetrically, A receives reports from B and puts them in $RDB_A$. If the size of $RDB_A$ is bigger than $S_A$ (Recall that $S_A$ is the size limit of $RDB_A$), then the GRS algorithm is executed to select the reports for saving.
9. For each report R received from B, construct the set H of queries in $QDB_A$ that are satisfied by R. For each query Q in H, send Q to Q's query originator via the backchannel, using the backchannel scheme.

TABLE 7

Pseudo-code of the relay interaction as sender in MARKET + Bakchannel.

Procedure: Peer A participates as the sender in the relay interaction, with backchannel
Process: 1. If A does not have any neighbor, then the relay interaction ends. Otherwise compute X, the set of reports $RDB_A$ that have not been previously transmitted by A.
2. Compute K, the transmission size, using the GC formula.
3. Fill up MSG, a message of K bytes, with the reports in X; the reports are selected in their rank order, using the GRS algorithm.
4. Construct ADV a message that includes the id's of the reports in MSG. Broadcasts ADV.

TABLE 7-continued

Pseudo-code of the relay interaction as sender in MARKET + Bakchannel.

5. Receive the request (if any) sent from any neighbor. (Such a request is received if the neighbor is interested in any report identified in ADV).
6. Broadcast MSG if at least one request is received. Observe that the whole set of reports is broadcasted if at least one request is received; the request does not specify a set of report id's.

TABLE 8

Pseudo-code of the relay interaction as receiver in MARKET + Backchannel.

Procedure: Peer A participates as a receiver in the relay interaction (A receives from B), with backchannel.
Input: $TS_A$ is the tracking set maintained by A
ADV is the advertisement message sent from B
Process: 1. Wait for a random time between 0 and 1 millisecond.
2. If a request responding to ADV is heard from any other peer, the interaction ends. Otherwise, if ADV includes the id's of any reports that are not in $TS_A$, then send to B an REQ message; the message indicates that A wants to receive the reports identified in ADV.
3. Receive these reports from B and put them in $RDB_A$. If the size of $RDB_A$ is bigger than $S_A$, then the GRS algorithm is executed to select the reports for saving.
4. For each report R received from B, construct the set H of queries in $QDB_A$ that are satisfied by R. For each query Q in H, send Q to Q's query originator via the backchannel, using the backchannel scheme.

Limiting Energy Consumption

In an embodiment of the invention, a variant of the MARKET algorithm, called MARKET+Energy, accommodates a bound on the energy consumed during a time period. In an example implementation, before participating in reports dissemination, each owner of a mobile peer A specifies the energy constraint EC: "from now until time H, the mobile P2P system (i.e. the MARKET algorithm) is allowed to use at most F % of the energy currently available at A" (The rest is used for voice communication, internet access, etc.). The allocated energy covers all the energy consumed by reports dissemination, including the energy used for transmission, receiving, listening, and computation. F is called the energy allocation fraction. Given $\Omega$ Joules of remaining energy, this constraint is translated into the following specification: "At peer A, the MARKET algorithm may use no more than $\Omega \cdot F$ Joules until time H". The pair ($\omega \cdot F$, H) is the energy budget.

The energy consumption for listening is a constant h Joules per second. Typically h is one order of magnitude higher than w. The energy consumption for transmission and receiving depends on the size of the message. Let the size of a message be M bytes excluding the MAC header. According to [4], the energy consumed for transmitting or receiving the message can be described using a linear equation.

$$En = f \cdot M + g \qquad (3.4)$$

Intuitively, there is a fixed component associated with the network interface state changes and channel acquisition overhead, and an incremental component which is the size of the message. Experimental results confirm the accuracy of the linear model and are used to determine values for the coefficients g and f. The values of g and f differ depending on whether the message is being transmitted or received, and whether it is unicast message or broadcast message. For example, for an 802.11 broadcast transmission, $g = 266 \times 10^{-6}$ Joule, and $f = 5.27 \times 10^{-6}$ Joule (see [4]). [4] also gives the value of h.

The energy consumption for sleeping is typically an order of magnitude lower than that for listening. For the simplicity of discussion, we assume that the sleep mode does not consume any energy. However, our method easily extends to the case in which the energy consumption of the sleep mode is non-zero.

Figure 11:
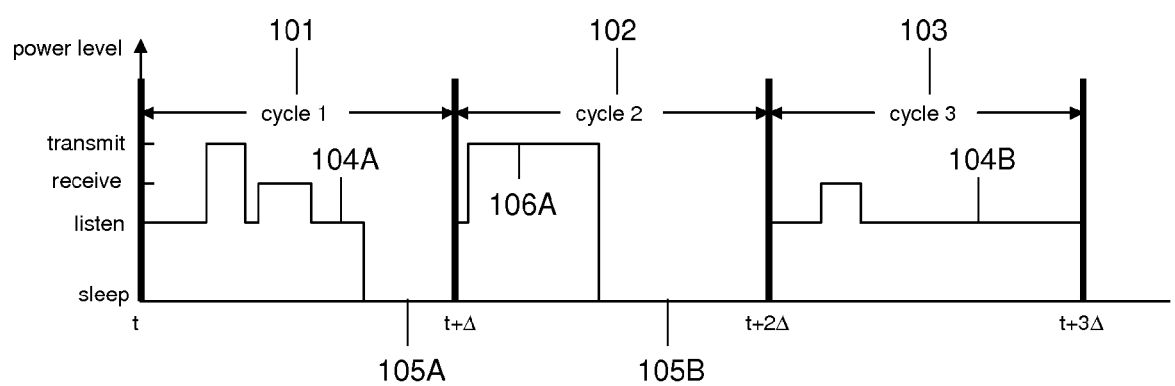
FIG. 11 illustrates the principle of a MARKET+Energy algorithm.

FIG. 11 illustrates the principle of MARKET+Energy. At each mobile peer, the time axis is divided into intervals of equal length $\Delta$. Each interval is called a cycle 101, 102, 103. At the time when a cycle C starts, C is assigned an energy quota $EQ_C$ for the consumption of all MARKET operations executed within C, including listening, transmission, receiving, and sleeping. $EQ_C$ is called the cycle quota of C. C starts with the listen mode, and may enter into the transmit or receive mode afterwards according to the MARKET algorithm. Each transmission or receiving operation has a maximum number of bytes that can be transmitted or received for that operation. This maximum transmission or receiving size depends on the remaining cycle quota. After the transmission or receiving operation completes, C returns to the listen mode and stays at the listen mode until either the cycle quota is used out, or the cycle ends, or another transmission or receiving operation is initiated[5]. If the cycle quota is used out before the end time of C, C switches to the sleep mode and stays at the sleep mode until the next cycle.

[5]Another option is that if after entering into the listening mode the peer does not receive any message addressed to it within a certain time interval (e.g., 20 milliseconds), then the cycle enters into the sleep mode. This option minimizes the energy used for listening but does not necessarily fully utilize the available energy, and therefore is not considered in this paper.

In FIG. 11, Cycle 1 101 experiences a sequence of listen/transmit/receive operations, returns to the listen mode 104A, and switches to the sleep mode 105A after the cycle quota is used out. Cycle 2 102 uses out the cycle quota in a transmit operation 106A and switches to the sleep mode 105B afterwards. Cycle 3 103 ends at the listen mode 104B.

The size of a transmission is jointly determined by three factors: (i) The transmission size that optimizes the utilization of bandwidth, which is determined by the GC formula (see FIG. 7 formula 701); (ii) The maximum transmission size allocated to the sender; (ii) The maximum receiving size allocated to the receiver. The receiver informs the sender of the maximum receiving size prior to the transmission. The final transmission size is the minimum among the optimal transmission size, the maximum transmission size, and the maximum receiving size. In other words, the final transmission size is the value that is closest to the optimal transmission size and is not larger than the maximum transmission size and the maximum receiving size.

The performance of the above scheme is better if the cycles are synchronized among all the mobile peers. The synchronization can done through a clock synchronization protocol, or through the GPS units attached to the mobile peers (if equipped with), or the cellular infrastructure (if the mobile peer is cellular enabled).

In one embodiment, at the start time of a cycle C, MARKET+Energy computes the amount of energy that it consumed from its initialization until now, and determines how much energy remains available for it. The energy consumed by the MARKET+Energy algorithm, including transmitting, receiving, listening, and computing, is tracked as follows. For each execution of MARKET+Energy, the algorithm reads the amounts of the energy before and after the execution. The difference between the two is the energy consumed by the execution of the algorithm. Here we assume that MARKET+Energy is the only application using the 802.11 network interface. If there are other applications using the 802.11 network interface, then only a fraction of the listening energy is charged to the MARKET+Energy algorithm. Thus at any point in time the device is able to compute $\Omega_{avail}$ the remaining energy that is available for MARKET+Energy until time H. Specifically, let $\Omega_{consumed}$ be the total amount of energy that has been consumed by MARKE+Energy until the start time of the cycle C. Let T be the stat time of C. The cycle quota of C is $$EQ_C = \frac{Q \cdot F - \Omega_{consumed}}{H - T} \cdot \Delta \qquad (3.5)$$

Intuitively, Eq. 3.5 evenly distributes the remaining available energy among the remaining cycles of the mobile peer's life-time. However, since the cycle quota is recomputed at the start times of each cycle, the actual cycle quota may vary per cycle. Particularly, if a cycle does not use out its quota (e.g., no communications during the cycle), then a part of the leftover will be added to the next cycle.

Computing the Maximum Transmission/Receiving Size

Consider a transmission operation that is to be initiated at a cycle C. Let $\Omega_{cycle}$ be the total amount of energy that has been consumed by the cycle C. The maximum transmission size is $$M_{max} = \frac{(EQ_C - \Omega_{cycle}) - g}{f} \qquad (3.6)$$

In other words, the maximum transmission size is the size that uses out the remaining cycle quota. The maximum receiving size is computed in the same way.

Figure 12:
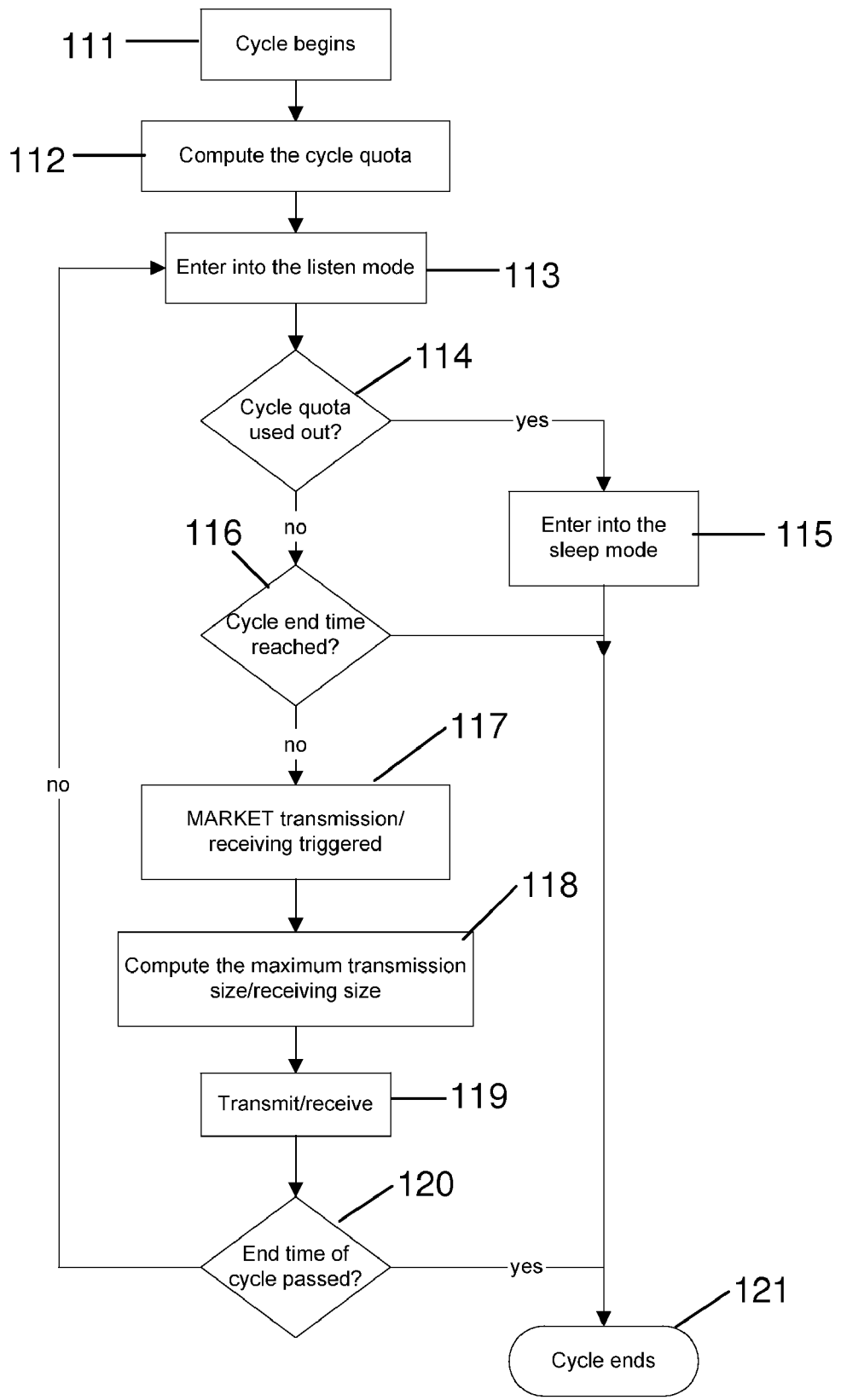
FIG. 12 shows a flowchart of the MARKET+Energy algorithm.

FIG. 12 shows a flowchart of the MARKET+Energy algorithm executed at a mobile peer. At Step 112, the mobile peer computes the cycle quota. At Step 113, the mobile peer enters into the listen mode. The mobile peer stays at the listen mode until either the cycle quota is used out, or the cycle end time is reached, or a MARKET transmission/receiving is triggered. If the cycle quota is used out, the mobile peer enters into the sleep mode 115 until the cycle end time is reached 121. If a MARKET transmission/receiving is triggered, the mobile peer computes the maximum transmission size/receiving size 118. If the transmission or receiving operation 119 completes before the cycle end time, then the mobile peer returns to the listen mode 113. Otherwise, the cycle ends but the transmission or receiving operation 119 continues until it completes.

The MARKET+Energy algorithm can best be understood by those of ordinary skill in the art if expressed as pseudo-code. The pseudo-code set forth below in Table 9, Table 10, and Table 11 describe the currently preferred embodiment of the invention. Other embodiments are readily apparent to those skilled in the art.

TABLE 9

Pseudo-code of the QR interaction in MARKET + Energy

Procedure: Query-response, executed at peer A when A encounters a peer B.
Input: $Q_A$ and $Q_B$ are the internal queries of A and B respectively
$IDS_A$ is the set of the id's of the reports in $RDB_A$
$IDS_B$ is the set of the id's of the reports in $RDB_B$
$TS_A$ and $TS_B$ are the tracking sets maintained by A and B respectively
Process: 1. Send $Q_A$ and $IDS_A$ to B by unicast.
// By this step A informs B what A wants ($Q_A$) and what A has to offer ($IDS_A$).

TABLE 9-continued

Pseudo-code of the QR interaction in MARKET + Energy

2. Receive $Q_B$, $IDS_A$-$TS_B$, $IDS_B$-$IDS_A$, $M_{rec}^B$ from B, where $M_{rec}^B$ is the maximum receiving size computed by B as discussed in §4.3.4.3.1.
// By this step A knows what B wants ($Q_B$), what B does not know ($IDS_A$-$TS_B$), and what B has to offer ($IDS_B$-$IDS_A$).
3. Put $Q_B$ in the demand database $QDB_A$.
// $QDB_A$ is FIFO-maintained.
4. Invoke MALENA to create examples and train the machine learning system.
// The reports referred to by $IDS_A$-$TS_B$ are new to B, and those referred to by $IDS_A \cap TS_B$ (i.e., $IDS_A$-($IDS_A$-$TS_B$) are old to B.
5. Compute K= min($M_{opt}^A$, $M_{trans}^A$, $M_{rec}^B$) where $M_{opt}^A$ and $M_{trans}^A$ are the optimal transmission size and the maximum transmission size computed by A.
6. Fill up a message of K bytes in the following order:
   a. $IDS_B$-$TS_A$ // This is the set of the id's of the reports in B's reports database that are new to A.
   b. $M_{rec}^A$ the maximum receiving size computed by A.
   c. the reports in $RDB_A$ that satisfy $Q_B$ and their id's are in $IDS_A$-$TS_B$ (these are the answers to $Q_B$ that are unknown to B).
   If all the reports in this category do not fit in the message, they are selected in descending order of $Q_B(R)$/size(R). (GRS)
   d. other reports in $RDB_A$ whose id's are contained in $IDS_A$-$TS_B$ (these are the broker-enhancement reports). If all the reports in this category do not fit in the message, then the GRS algorithm described in §4.2.2 is executed to select the reports to include in the message.
7. Broadcasts the K-bytes message.
8. Symmetrically, A receives reports from B and puts them in $RDB_A$. If the size of $RDB_A$ is bigger than $S_A$ (Recall that $S_A$ is the size limit of $RDB_A$), then the GRS algorithm is executed to select the reports for saving.

TABLE 10

Pseudo-code of the relay interaction in MARKET + Energy as sender

Procedure: Peer A participates as the sender in the relay interaction
Process: 1. If A does not have any neighbor, then the relay interaction ends. Otherwise compute X, the set of reports $RDB_A$ that have not been previously transmitted by A.
2. Compute K= min($M_{opt}^A$, $M_{trans}^A$) where $M_{opt}^A$ and $M_{trans}^A$ are the optimal transmission size and the maximum transmission size respectively.
3. Fill up MSG, a message of K bytes, with the reports in X; the reports are selected in their rank order, using the GRS algorithm.
4. Construct ADV a message that includes the id's of the reports in MSG. Broadcasts ADV.
5. Receive the request (if any) sent from any neighbor. (Such a request is received if the neighbor is interested in any report identified in ADV).
6. Broadcast MSG if at least one request is received. Observe that the whole set of reports is broadcasted if at least one request is received; the request does not specify a set of report id's.

TABLE 10

Pseudo-code of the relay interaction in MARKET + Energy as receiver

Procedure: Peer A participates as a receiver in the relay interaction (A receives from B)
Input:   $TS_A$ is the tracking set maintained by A
         ADV is the advertisement message sent from B
Process: 1. Wait for a random time between 0 and 1 millisecond.
2. If a request responding to ADV is heard from any other peer, the interaction ends. Otherwise, if ADV includes the id's of any reports that are not in $TS_A$, then send to B an REQ message; the message indicates that A wants to receive the reports identified in ADV.
3. Receive these reports from B and put them in $RDB_A$. If the size of $RDB_A$ is bigger than $S_A$, then the GRS algorithm is executed to select the reports for saving.

In summary, this invention includes the MARKET algorithm for querying MANET databases. MARKET includes a novel strategy for a mobile peer to prioritize the reports based on their relevance. The relevance of a report depends on its size, demand (how many peers are querying it), and supply (how many peers already have it). Queries are disseminated to enable the estimation of demand. A machine learning algorithm, called MALENA, is used to enable the estimation of the supply.

REFERENCES

[1] Y. Huang, H. Garcia-Molina. Publish/Subscribe Tree Construction in Wireless Ad-Hoc Networks. *MDM '03*.
[2] M. Papadopouli and H. Schulzrinne. Effects of power conservation, wireless coverage and cooperation on data dissemination among mobile peers. *MobiHoc*, 2001.
[3] M. Motani, et al. PeopleNet: Engineering A Wireless Virtual Social Network. *MobiCom*, 2005.
[4] L. Feeney, M. Nilson. Investigating the Energy Consumption of a Wireless Network Interface in an Ad Hoc Networking Environment. *INFOCOM*, 2001.
[5] Ouri Wolfson, et al. Search-and-Discover in Mobile P2P Network Databases. ICDCS, 2006.
[6] A. Datta, et. al. Autonomous Gossiping: A self-organizing epidemic alg. for selective information dissemination in wireless mobile ad-hoc networks. ICSNW'04.
[7] J. Kulik, et al. Adaptive protocols for information dissemination in wireless sensor networks. MobiCom'99.
[8] G. Cao, L. Yin, C. Das. Cooperative Cache-Based Data Access in Ad Hoc Networks. *Computer*, vol. 37, no. 2, pp. 32-39, February, 2004.
[9] F. Sailhan and V. Issarny. Energy-aware web caching for mobile terminals. *ICDCSW '02*.
[10] F. Ingelrest, et al. Energy-Efficient Broadcasting in Wireless Mobile Ad Hoc Networks, in: *Resource Management in Wireless Networking*, Springer, 2005.
[11] O. Wolfson et. al., Resource Discovery using Spatio-Temporal Information in Mobile Ad-Hoc Networks, *W*2GIS'05.
[12] S. Das et al. Ekta: An efficient dht substrate for distributed applications in mobile ad hoc networks. WMCSA 2004.
[13] F. Perich, et al. On Data Management in Pervasive Computing Environments. TKDE, 16(5), 2004.
[14] Yu Wang, Hongyi Wu. Delay/Fault-Tolerant Mobile Sensor Network (DFT-MSN): A New Paradigm for Pervasive Information Gathering. IEEE TOMC, 6(9), 2007.
[15] O. Wolfson and B. Xu. Mobile Peer-to-peer Data Dissemination with Resource Constraints. *MDM '07*.
[16] U.S. Pat. No. 6,292,657, Method and architecture for managing a fleet of mobile stations over wireless data networks
[17] U.S. Pat. No. 5,915,207, Mobile and wireless information dissemination architecture and protocols
[18] U.S. Pat. No. 6,810,323, System and method for storing and using information associated with geographic locations of interest to a mobile user
[19] U.S. Pat. No. 7,149,534, Peer to peer information exchange for mobile communications devices
[20] U.S. Pat. No. 6,112,206, Data collection and dissemination system
[21] U.S. Pat. No. 7,181,230, Mobile unit information sharing system
[22] U.S. Pat. No. 7,113,796, Framework and method for QoS-aware resource discovery in mobile ad hoc networks
[23] U.S. Pat. No. 6,785,542, Resource proxy for mobile wireless electronic devices
[24] U.S. Pat. No. 6,909,721, Device detection and service discovery system and method for a mobile ad hoc communications network

[25] U.S. Pat. No. 6,604,140, Service framework for computing devices
[26] U.S. Pat. No. 6,708,107, Real-time ad hoc traffic alert distribution
[27] U.S. Pat. No. 7,027,772, Inter-vehicle message disseminating method and apparatus for the application of the method
[28] U.S. Pat. No. 7,072,650, Ad hoc peer-to-peer mobile radio access system interfaced to the PSTN and cellular networks
[29] U.S. Pat. No. 6,961,575, Ad Hoc peer-to-peer mobile radio access system interfaced to the PSTN and cellular networks
[30] U.S. Pat. No. 6,879,574, Mobile mesh Ad-Hoc networking
[31] U.S. Pat. No. 6,845,091, Mobile ad hoc extensions for the internet
[32] U.S. Pat. No. 6,957,069, Wireless personal communicator and communication method
[33] U.S. Pat. No. 7,110,372, Transmission of carry-on objects using a wireless ad-hoc networking environment
[34] U.S. Pat. No. 7,043,252, Information transmission method for a wireless local network
[35] U.S. Pat. No. 7,184,421, Method and apparatus for on demand multicast and unicast using controlled flood multicast communications
[36] U.S. Pat. No. 6,954,435, Determining quality of service (QoS) routing for mobile ad hoc networks
[37] U.S. Pat. No. 6,940,832, Routing method for mobile infrastructureless network
[38] U.S. Pat. No. 6,870,846, Hierarchical mobile ad-hoc network and methods for performing reactive routing therein using dynamic source routing (DSR)
[39] U.S. Pat. No. 6,718,394, Hierarchical mobile ad-hoc network and methods for performing reactive routing therein using ad-hoc on-demand distance vector routing (AODV)
[40] U.S. Pat. No. 7,177,295, Wireless routing protocol for ad-hoc networks
[41] U.S. Pat. No. 7,151,769, Prioritized-routing for an ad-hoc, peer-to-peer, mobile radio access system based on battery-power levels and type of service
[42] U.S. Pat. No. 6,873,839, Prioritized-routing for an ad-hoc, peer-to-peer, mobile radio access system
[43] U.S. Pat. No. 6,873,839, Prioritized-routing for an ad-hoc, peer-to-peer, mobile radio access system
[44] U.S. Pat. No. 6,816,460, Location based routing for mobile ad-hoc networks
[45] U.S. Pat. No. 6,735,448, Power management for throughput enhancement in wireless ad-hoc networks
[46] U.S. Pat. No. 6,970,714, Adaptive power level setting in an ad-hoc wireless network

We claim:

1. A method of searching information located within a plurality of peer-devices wherein said plurality of peer-devices store information in the form of reports and communicate by a short-range wireless network, comprising the steps of:
   (a) initiating a multihop search, represented by a query, by an originator in said plurality of peer-devices wherein said originator does not need to know the locations of searched reports;
   (b) transmitting said query by said originator to at least one neighbor of said originator, wherein a neighbor is an additional peer-device in said plurality of peer-devices that is within transmission range of a transmitter;
   (c) selecting queries and reports from local storage by set X of peer-devices from said plurality of peer-devices that receive queries or reports, and transmitting selected queries and reports to neighbors of said set X;
   (d) repeating step 1 (c) recursively; and
   (e) ranking reports by a peer-device P1, wherein the rank of a report R1 is a function of the demand for R1 which is the number of peer-devices in said short-range wireless network requesting R1 or the total degree to which R1 matches the requests of said peer-devices, or of the size of R1, or of the reliability of R1, or of the supply of R1 in said short-range wireless network wherein said supply is the fraction of peer-devices having R1;
   wherein the rank of said report R1 computed by said peer-device P1 at time t, denoted rank(R1, t), is proportional to demand(R1,t), or proportional to (1-supply(R1,t)), or proportional to reliability(R1, t) where reliability(R1,t) is a function that returns the reliability of R1 at time t, or inversely proportional to size (R1).

2. The method of claim 1, wherein the rank of said report R1 computed by said peer-device P1 at time t, denoted rank(R1,t), is approximately $$\frac{\text{demand}(R1, t) \cdot (1 - \text{supply}(R1, t)) \cdot \text{reliability}(R1, t)}{\text{size}(R1)},$$

where reliability(R1,t) is a function that returns the reliability of R1 at time t.

3. The method of claim 2 wherein said peer-device P1 selects reports to transmit or save using an algorithm whose objective is to maximize rank(R1,t)×size(R1).

4. The method of claim 1 wherein said peer-device P1 selects reports to transmit or save using an algorithm whose objective is to maximize rank(R1,t)×size(R1).

5. The method of claim 1, wherein said peer-device P1 stores a database of queries that represents a demand for reports in said short-range wireless network.

6. The method of claim 5, wherein said peer-device P1 saves in said database of queries the queries of latest peer devices encountered.

7. The method of claim 5, wherein said peer-device P1 sets the size of database of queries such that the accuracy of an estimated demand is higher than a pre-specified level of confidence.

8. The method of claim 1, further comprising the steps of:
   estimating by said peer-device P1 the fraction of peer-devices in said short-range wireless network that have said report R1 at a particular time, denoted supply(R1), wherein:
   (a) said peer device P1 uses a number of indicator variables, including the age of R1 or the number of times P1 received R1, to determine whether or not R1 is new R1's recipient peer-devices;
   (b) said peer-device P1 puts either a pair (indicator-variables' values, "new") or a pair (indicator-variables' values, "not new") in P1's examples database, based on the determination in 10(a); and
   (c) when R1 is ranked by P1, it invokes a machine learning algorithm that uses said P1's examples database to determine the probability that if transmitted, R1 will be new to a recipient peer-devices, and this is taken to be supply(R1).

9. The method of claim 8, wherein a MALENA algorithm is an instance of the implementation.

10. The method of claim 8, further comprising the steps of:
(a) improving a "new" or "not new" labeling, by said peer-device P1, by maintaining a tracking set, wherein said tracking set stores a plurality of identifications of the reports that have been received by P1; and
(b) labeling a report "not new" by said peer-device P1, if its identification is in said tracking set.

11. The method of claim 1, wherein a peer-device P2 dynamically adjusts a transmission size or an inter-transmission period of time, to optimize utilization of bandwidth or transmission energy, comprising the steps of:
(a) computing the capacity of said short-range wireless network, by said peer-device P2, as a function of the inter-transmission period of time and of the transmission-size; and
(b) either
(b.1) selecting said transmission size, by said peer-device P2, that optimizes the capacity of said short-range wireless network for a given inter-transmission period of time; or
(b.2) selecting said inter-transmission period of time, by said peer-device P2, that optimizes the capacity of said short-range wireless network for a given transmission size $$ThR \approx 2 \cdot \pi \cdot \lambda \cdot k \cdot \frac{1}{c} \cdot \int_0^r \delta \cdot (1-p')^{\lambda \cdot r \left(2 \cdot q\left(\frac{\delta}{2 \cdot r}\right) + \left(\pi - 2 \cdot q\left(\frac{\delta}{2 \cdot r}\right)\right)\right)\cdot(2T+1))-1} d\delta).$$

12. The method of claim 1, further comprising a multi-mode communication protocol, executed by said plurality of peer-devices, wherein a transmission by a peer-device P3 is initiated when encountering another peer-device; if such an encounter does not occur within a pre-specified period of time, then reports received by P3 since the last transmission are broadcast to peer-devices in transmission range.

13. The method of claim 1, further comprising the step of: using access to the Internet or a cellular network in order to enhance search, wherein if a peer-device P4 receives a report R2 that matches a query originating in another peer-device P5, then P4 may send said report R2 to P5 via the Internet or said cellular network.

14. The method of claim 1, wherein a user of a peer-device P6 is allowed to limit total energy E of P6 allocated to search for a specified life-time T, wherein:
(a) said peer-device P6 divides said specified life-time T into cycles;
(b) said peer-device P6 assigns to a cycle an energy quota Q when said cycle starts, wherein said energy quota Q is based on the remaining available energy and the remaining life-time of said peer-device P6; and
(c) said peer-device P6 stops transmission, receiving, and listening on behalf of search when energy consumed by search at P6 at said cycle, including transmission, receiving, and listening, exceeds said energy quota Q.

15. The method of claim 1, further comprising synchronization of peer-devices in said short-range wireless network, wherein:
(a) each peer-device divides time into listen-transmit-receive cycles;
(b) in each cycle, each peer-device performs listening, transmitting, and receiving in some order; and
(c) cycles of all the peers-devices are synchronized using a Global Positioning System time, or the time of a cellular service provider, or any other time service.

16. A non-transitory computer readable medium having stored therein instructions for causing a processor to execute the method of claim 1.

17. A method of searching information in a group of peer-devices, in a peer to peer system communicating by short-range wireless network, comprising the steps of:
(a) storing information by a plurality of peer-devices, wherein said plurality of peer-devices are in communication with each other;
(b) transmitting queries or reports by said plurality of peer-devices, wherein a report represents a piece of information and transmitting and receiving peer-devices are within a transmission range;
(c) utilizing for a search additional peer-devices, by an originator, wherein said additional peer-devices search and relay information on behalf of said originator;
(d) estimating by a peer-device the fraction of peer-devices in said short-range wireless network that have a report at a particular time using the MALENA algorithm; and
(e) dynamically adjusting a transmission size or an inter-transmission period of time, by a peer-device, to optimize utilization of bandwidth and transmission energy, comprising the steps of:
(e.1) computing the capacity of said short-range wireless network, by said peer-device, as a function of inter-transmission period of time and transmission-size; and (e.2) either
(e.2.1) selecting said transmission size, by said peer-device, that optimizes the capacity of said short-range wireless network for a given inter-transmission period of time; or
(e.2.2) selecting said inter-transmission period of time, by said peer-device, that optimizes the capacity of said short-range wireless network for a given transmission size.

* * * * *

UNITED STATES PATENT AND TRADEMARK OFFICE
CERTIFICATE OF CORRECTION

| | | |
|---|---|---|
| PATENT NO. | : 7,849,139 B2 | Page 1 of 1 |
| APPLICATION NO. | : 12/114150 | |
| DATED | : December 7, 2010 | |
| INVENTOR(S) | : Ouri Wolfson and Bo Xu | |

It is certified that error appears in the above-identified patent and that said Letters Patent is hereby corrected as shown below:

Column 28, line 56, insert --at-- before "R1's recipient peer-devices". In other words, portion (a) of claim 8 should appear as follows:
(a) said peer-device P1 uses a number of indicator variables, including the age of R1 or the number of times P1 received R1, to determine whether or not R1 is new at R1's recipient peer-devices;

Column 28, line 60, "10(a)" should be changed to --8(a)--.

Column 28, line 64, "a recipient peer-devices" should be changed to --recipient peer-devices--.

Column 29, line 25, delete the following portion:

$$\text{``} ThR \approx 2 \cdot \pi \cdot \lambda \cdot k \cdot \frac{1}{c} \cdot \int_0^r \delta \cdot (1-p')^{\lambda \tau \left(2\pi\left(\frac{\delta}{2\tau}\right)+(\tau-\lambda\tau\left(\frac{\delta}{2\tau}\right))(2\tau+1)\right)-1} d\delta \text{ ''}.$$

In other words, portion (b.2) of claim 11 should appear as follows:
(b.2) selecting said inter-transmission period of time, by said peer-device P2, that optimizes the capacity of said short-range wireless network for a given transmission size.

Signed and Sealed this
Seventeenth Day of May, 2011

David J. Kappos
*Director of the United States Patent and Trademark Office*